US00RE40032E

(19) United States
(12) Reissued Patent
van Bokhorst et al.

(10) Patent Number: US RE40,032 E
(45) Date of Reissued Patent: Jan. 22, 2008

(54) WIRELESS DATA COMMUNICATION SYSTEM HAVING POWER SAVING FUNCTION

(75) Inventors: Hendrik van Bokhorst, Nijkerk (NL); Albertus M. G. Claessen, Oakwood, GA (US); Wilhelmus J. M. Diepstraten, Haghorst (NL); Johannes P. N. Haagh, Eindhoven (NL); Hendrik Moelard, Maarssen (NL); Leo Monteban, Nieuwegein (NL); Rienk Mud, Wijk bij Duurstede (NL)

(73) Assignee: Agere Systems Inc., Allentown, PA (US)

(21) Appl. No.: 10/368,018

(22) Filed: Feb. 19, 2003

Related U.S. Patent Documents

Reissue of:
(64) Patent No.: 6,192,230
Issued: Feb. 20, 2001
Appl. No.: 08/127,268
Filed: Sep. 27, 1993

(30) Foreign Application Priority Data

Mar. 6, 1993 (GB) ..... 9304638

(51) Int. Cl.
*H04B 7/14* (2006.01)

(52) U.S. Cl. ..... 455/343.2; 455/517; 455/574; 455/426.1; 455/41.2; 455/343.4; 370/311

(58) Field of Classification Search ..... 455/426.1, 455/41.2, 41.3, 445, 502, 503, 514, 343.2, 455/343.4, 517, 574; 370/338, 311, 503, 370/449; 11/11
See application file for complete search history.

(56) References Cited

U.S. PATENT DOCUMENTS 4,794,649 A * 12/1988 Fujiwara ..... 455/343
5,241,542 A * 8/1993 Natarajan et al. ..... 370/311
5,278,831 A * 1/1994 Mabey et al. ..... 455/343
5,371,734 A * 12/1994 Fischer ..... 370/311

FOREIGN PATENT DOCUMENTS

EP 0319219 * 6/1989
EP 0443516 * 8/1991
EP 0529269 * 3/1993
WO 9219059 * 10/1992

* cited by examiner

*Primary Examiner*—Edan Orgad

(57) ABSTRACT

A wireless data communication system is operable in a power saving mode wherein stations are synchronized to be in an awake state to receive synchronizing messages (TIM, PSYNC) and traffic indicator information and are changed to a doze state if they are not to receive data messages. In one embodiment all stations (20) communicate via a base station access point (16), which broadcasts synchronizing messages (TIM) at regular intervals identifying stations (20) that are to receive data messages. In another embodiment all stations (220) communicate directly with one another, one station assumes the role of a master station and broadcasts synchronizing messages (PSYNC), and stations (220) desiring to transmit data messages transmit traffic indicator messages (PTIM) to the appropriate destination stations (220), in a synchronized awake period just before the next synchronizing message (PSYNC) is expected to arrive.

179 Claims, 9 Drawing Sheets

WIRELESS DATA COMMUNICATION SYSTEM HAVING POWER SAVING FUNCTION

Matter enclosed in heavy brackets [ ] appears in the original patent but forms no part of this reissue specification; matter printed in italics indicates the additions made by reissue.

BACKGROUND OF THE INVENTION

This invention relates to wireless data communication systems.

A recent development in the field of local area networks (LANs), has been the introduction of wireless communication in such networks. Another development has been the introduction of portable, battery-operated devices for use in such wireless networks.

International Patent Application No. WO 92/19059 discloses a wireless data communication system which includes a cable-based network to which are attached controllers which maintain a portable device in communication with the network for data transfer. The portable unit transmits polling packets at regular intervals. Normally, a response packet is received from the current controller. If no response packet is received for a predetermined number of attempts, the portable unit initiates a procedure for registering with a new controller. The portable unit is powered by a battery which supplies power to the unit's transceiver and packet processor via a switch. Following transmission of a polling packet, the portable unit remains fully active until a response packet is received, or until the expiry of a predetermined time period such as 10 milliseconds, and then operates the switch thereby disabling battery current to the packet processor and transceiver for a further predetermined time period, whereafter a new polling packet is transmitted. This procedure effects a power-saving function. Initially, the polling may be at a slow rate of about two second intervals, this rate being doubled each time a response packet is received. When the transmission rate is low, the polling rate is reduced, thereby reducing requirements for battery current. The power saving function is thus seen to be a complex procedure, involving the exchange of polling and response packets for each individual station, which results in inefficient use of the wireless communication medium. Furthermore, the two seconds response time is inadequate for normal network operation at current data rates. Thus, a 200 milliseconds interval is considered appropriate to ensure uninterrupted communication under the typical LLC (logical link control) layer protocols used in the majority of contemporary LAN networks. These protocols typically utilize a timeout timer having around 400 milliseconds duration, after which a transmitted packet is considered to have been lost. On expiry of such timer, the protocols will attempt a recovery procedure by retransmitting the packet a limited number of times.

SUMMARY OF THE INVENTION

It is an object of the present invention to provide a method for operating a wireless communication system having a power saving function, wherein efficient use of the wireless communication medium is achieved.

Therefore, according to one aspect of the present invention, there is provided a method of operating a wireless data communication system including a plurality of wireless stations, characterized by the steps of: broadcasting synchronizing messages from a selected one of said stations; identifying stations that are to receive data messages by transmitting traffic indicator information in association with said synchronizing messages; operating said stations in an awake state of relatively high power consumption while broadcasting said synchronizing messages and transmitting said traffic indicator information; changing the operating state of stations that are not to receive data messages to a doze state of relativity low power consumption after receiving a synchronizing message; and maintaining stations that are to receive data messages in said awake state for at least a time period during which one or more data messages are transmitted to those stations.

According to another aspect of the present invention, there is provided a wireless data communication system, including a plurality of wireless data communication stations, characterized in that a selected one of said stations includes synchronizing timing means adapted to control the transmission of synchronizing messages by the selected station; in that means are provided adapted to transmit traffic indicator information in association with said synchronizing messages, identifying stations that are to receive data messages; and in that said stations include switching means adapted to control the power supply applied to station transceiver means, such that said stations are controlled to be in an awake state of relatively high power consumption to receive said synchronizing messages and said traffic indicator information and any data messages to be received and are changed to a doze state of relatively low power consumption following receipt of said synchronizing messages and said traffic indicator information if no data messages are to be received.

It will be appreciated that in a method and apparatus according to the invention, the synchronous operation of the power saving function enables efficient use of the wireless medium to be achieved by reducing the number of messages transmitted over the wireless medium to effect the power saving function as compared with the system disclosed in the aforementioned International Patent Application No. WO 92/19059. Also, the synchronous operation is more power efficient since the earliest possible arrival time of the synchronizing message is known in advance.

BRIEF DESCRIPTION OF THE DRAWINGS

Two embodiments of the present invention will now be described by way of example, with reference to the accompanying drawings, in which.

DETAILED DESCRIPTION OF THE PREFERRED EMBODIMENT

Figure 1:
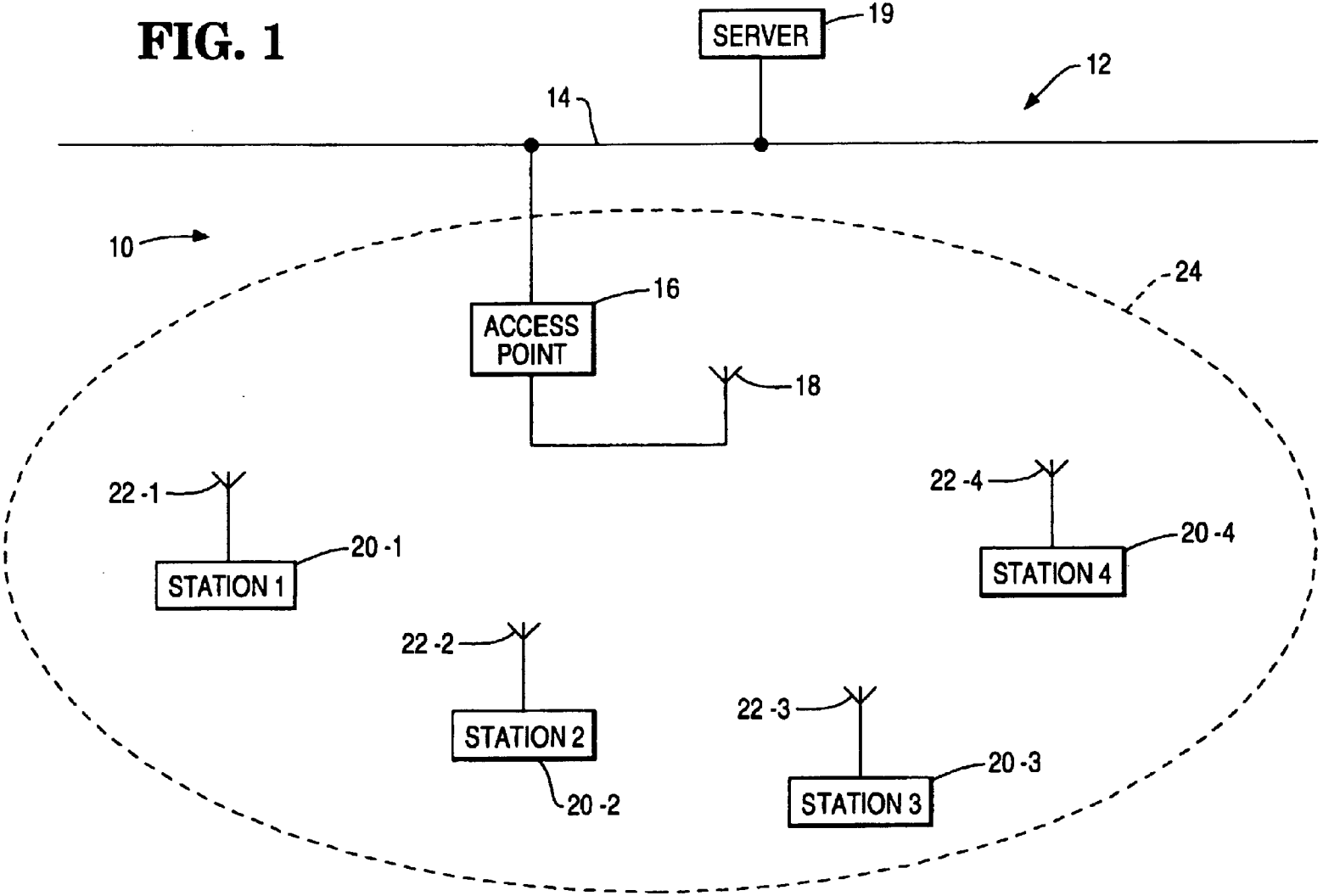
FIG. 1 shows a first embodiment of the invention including a plurality of mobile, battery-powered wireless stations and an access point.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

Referring first to FIG. 1, there is shown a block diagram of a wireless LAN system 10 embodying the present invention. The LAN system 10 includes a backbone LAN 12, which is a wired, cable-based LAN and which includes a cable 14 connecting to a base station, referred to herein as an access point 16. The access point 16 has an antenna 18. A server 19 may be connected to the cable 14 to provide a server function for devices communicating with the LAN 12. However, instead of or in addition to, the server 19, other devices or networks may be coupled to the LAN 12 to provide a communications infrastructure. Also included in the system are a plurality of mobile wireless stations 20, referenced individually as mobile stations 20-1 to 20-4. The mobile stations 20 have antennas 22, referenced individually as antennas 22-1 to 22-4.

The access point 16 has a coverage area, referred to herein as cell 24. It should be understood that additional access points (not shown), similar to the access point 16, may be connected to the cable 14 and form part of the LAN 12. Each mobile wireless station communicates with only one access point at any one time, depending on which cell the station is currently located in. This is effected by providing a cell identification portion in messages transmitted in the system. When a mobile station 20 moves from one cell 24 to another cell, a handover procedure is effected to hand over communications to a new access point. In a modification, the access point 16 is not connected to a backbone LAN, but has as its sole function the regulation of the traffic within its associated cell 24.

Figure 2:
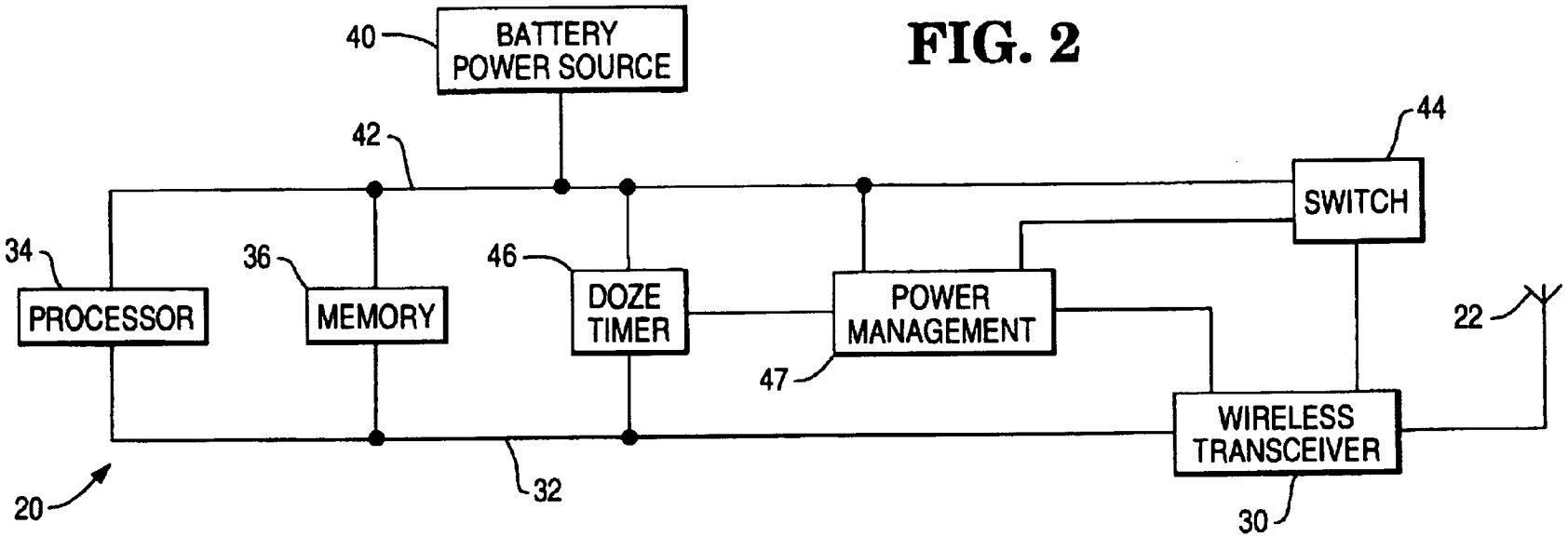
FIG. 2 is a block diagram of a typical mobile station.

Referring now to FIG. 2, there is shown a simplified block diagram of a mobile station 20. The mobile station 20 includes a wireless transceiver 30 coupled to the antenna 22 and to a bus 32. The mobile station 20 also includes, connected to the bus 32, a processor 34 and a memory 36. Other devices such as a keyboard (not shown) and a display (not shown) may be connected to the bus 32, to enable the mobile station 20 to function as a hand-held data processing device. The mobile station 20 may be configured to generate as a hand-held wireless scanner by providing a suitable scanning device (not shown) in the station 20. The mobile station 20 is battery powered, and includes a battery power source 40 connected to a power line 42, which supplies power to the components of the mobile station 20. The power line 42 is connected to supply continuous power to the processor 34 and memory 36. However, power is supplied to the wireless transceiver 30 via a switch 44 which operates under the control of a doze timer 46 and power managment circuit 47. In this connection, it should be understood that the transceiver 30 of the station 20 is either in an awake state or in a doze state, dependent on the state of the switch 44. In the awake state the transceiver 30 is fully powered, and capable of receiving or transmitting messages. In the doze state, the transceiver 30 is operated at a much lower power level and is not capable of receiving or transmitting messages. In the doze state, the transceiver 30 consumes significantly less power than when in the awake state. The switch 44 is switched on to initiate an awake state in response to the timing out of the doze timer 46, and is switched off to initiate a doze state by the power management circuit 47 at appropriate times as will be explained hereinafter. The station 20 is operable in either a continuous-active mode, in which the station is always in the awake state, or in a power-save mode, in which the station alternates between doze and awake states in a manner which will be explained in more detail hereinafter. The access pint 16 maintains a record of the operational mode (continuous-active or power-save) of each station in its cell 24. It should be understood that, in the power-save ode, all messages are transmitted via the access point 16, that is, direct message transmission between two stations is not possible.

Figure 3:
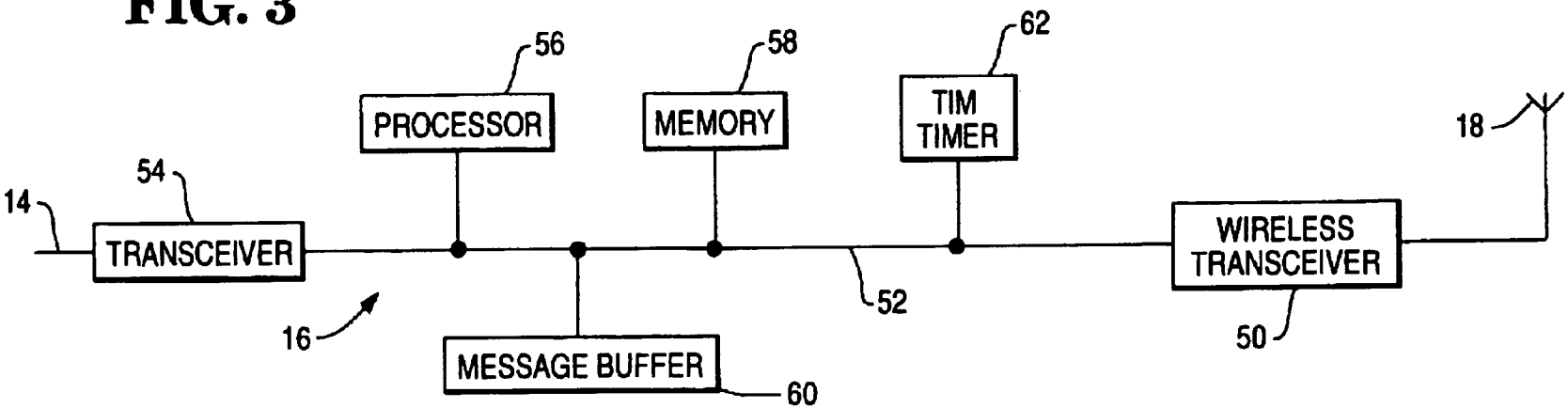
FIG. 3 is a block diagram of the access point.

Referring now to FIG. 3, there is shown a simplified block diagram of the access point 16. The access point 16 includes a wireless transceiver 50 coupled to the antenna 18 and to a bus 52. A further transceiver 54 connected to the bus 52 connects the access point 16 to the cable 14 of the backbone LAN 12 (FIG. 1). Also connected to the bus 52 are a processor 56, a memory 58, a packet buffer 60 and a TIM timer 62, the operation of which will be described hereinafter. In the aforementioned modification, where the access point 16 is not connected to a backbone LAN, the transceiver 54 is unnecessary and may be omitted.

The operation of the mobile station 20 in the power-save mode will now be described. The present invention enables a significant reduction in power consumption during the periods when a station is not transmitting or receiving messages, by switching the station to the doze state for a considerable part of this time. Reductions of more than 90% may be achieved. In operation, when a mobile station 20 is initially powered-up, it is put in the awake state, until it receives a TIM message (traffic indicator message) from the access point. It should be understood at this point that the access point 16 broadcasts TIM messages at regular intervals (such as every 200 milliseconds), under the control of the TIM timer 62 (FIG. 3).

Figure 4:
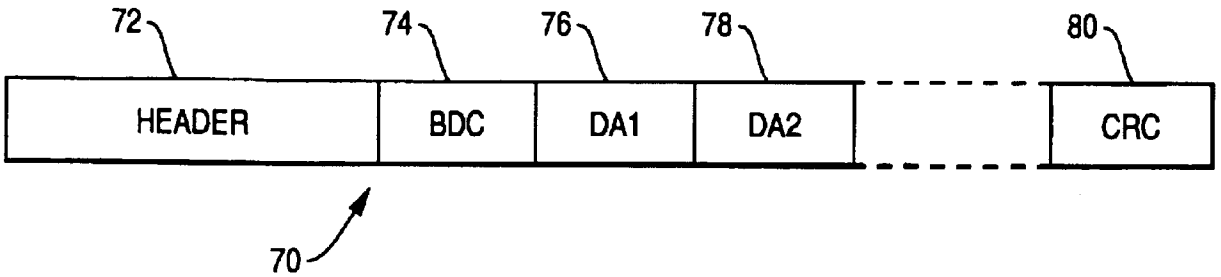
FIGS. 4 and 5 illustrate two types of traffic indicator messages.
Figure 5:
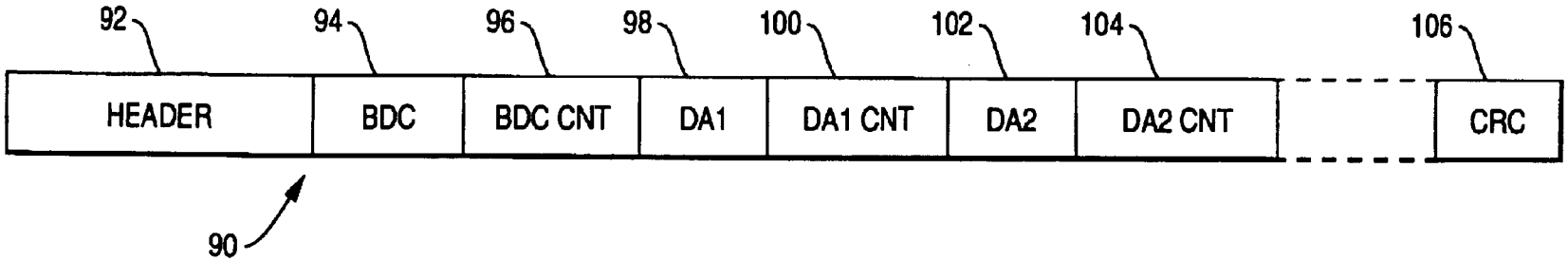

Referring briefly to FIGS. 4 and 5, there are shown two formats for the TIM messages. In the first format (shown in FIG. 4), the TIM message 70 includes a header portion 72, a broadcast message indicator portion 74, destination address portions 76, 78 etc. indicative of station addresses for which the access point 16 has messages stored in its buffer 60, and a check portion 80. The header portion 72 contains a conventional preamble portion, a cell identification portion, an identification of the TIM message as a broadcast packet, and a type field which indicates that the message is a TIM message. The header may also contain other portions which are not pertinent to the present invention and therefore will not be described herein.

The second format of a TIM message is shown in FIG. 5. This second format TIM message 90 includes a header portion 92 similar to the header portion 72 (FIG. 4), a broadcast indicator portion 94, and a broadcast count portion 96, which represents the number of broadcast messages buffered in the access point 16. The TIM message 90 further includes, for messages buffered in the access point 16, an identification of the destination addresses and the number of messages for each destination address. Thus, the message portions 98, 100,102 and 104 represent that there are pending messages for two destination addresses, and include counts representing the number of messages pending for the respective destination addresses.

Figure 6:
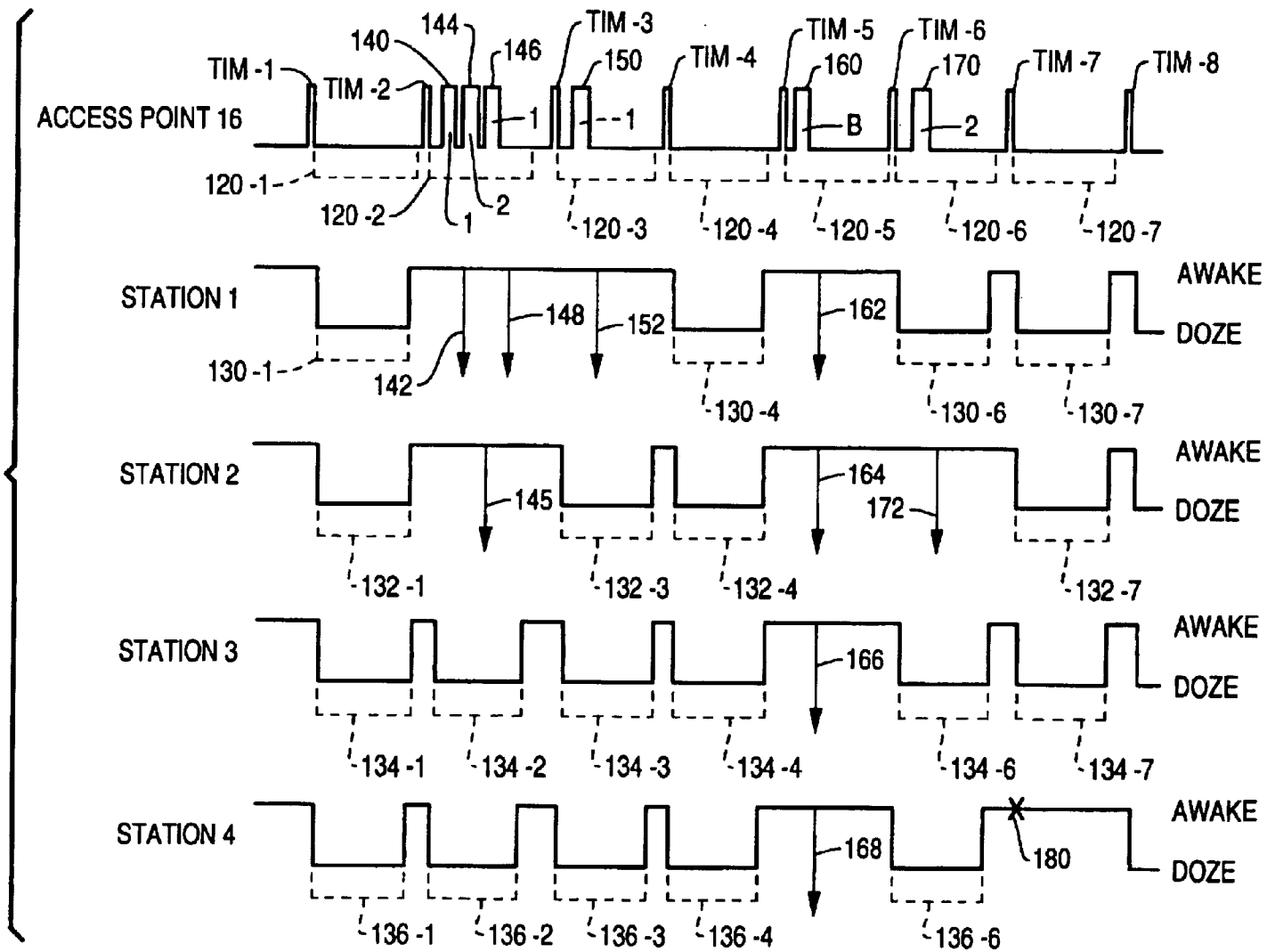
FIG. 6 is a timing diagram showing the alternation between doze and awake states of the mobile stations according to a first scheme.

The operation of the system in a first type of power-save mode, which is referred to as a "stay awake" mode, will now be described with reference to FIGS. 4 and 6. In this "stay awake" mode, the mobile stations which have received a message will stay awake until the next TIM message is received. Referring to FIG. 6, there is shown a timing diagram for the access point 16 and four mobile stations 20-1 to 20-4, referred to as stations 1, 2, 3 and 4, respectively. The top line of FIG. 6 illustrates the transmission by the access point 16 of eight TIM messages TIM-1 to TIM8. The dashed arrowed portions 120-1 to 120-7 represent the operation of the TIM interval timer 62 (FIG. 3). Thus, the TIM interval timer 62 is initiated after each transmission of a TIM message, and after the expiry of the TIM timer (e.g. after a 200 millisecond interval), the transmission of a new TIM message is initiated. It will be appreciated that as a result of medium access protocol requirements, the actual times at which TIM messages are transmitted may very slightly.

Referring again to FIG. 6, it is assumed that the first TIM message TIM-1 indicates that no messages are to be transmitted by the access point 16. The receipt at the mobile stations 1 to 4 of the TIM-1 message triggers the respective doze interval timers 46 (FIG. 2) at the stations, and causes all these stations to go to the doze state for intervals represented by the dashed line intervals 130-1,132-1,134-1 and 136-1. At the end of these intervals, each station 1 to 4 is switched to the awake state. It will be appreciated that the duration of the doze interval is chosen such that the station transceiver is in the awake state prior to the earliest time that the next TIM message can arrive. This ensures that no TIM message is lost due to a late switching to the awake state.

Proceeding with the operational description, it is assumed that the next TIM message TIM-2 indictes that messages are to be transmitted to stations 1 and 2. Thus, stations 1 and 2 remain awake at least until the reception of the next TIM message, and their doze timers are not effective. A message to station 1 is transmitted during time interval 140, the receipt thereof resulting in a data interrupt to the processor of station 1, as shown by arrow 142. During time interval 144, a message for station 2 providing a data interrupt to its processor as shown by arrow 145. During time interval 146, a second message for station 1 is transmitted, the receipt thereof resulting in a data interrupt to the processor of station 1, as shown by arrow 148. It should be understood that since stations 1 and 2 remain awake at least until the reception of the next TIM message, then any messages that arrive at the access point in the current TIM interval before the transmission of the next TIM message can also be transmitted during such current TIM interval to stations (such as stations 1 and 2) which are awake during that interval.

It is assumed that the next TIM message, TIM-3, indicates that there is a message for station 1 only. Thus, station 1 remains awake for the duration of the next TIM interval, whereas station 2 returns to the doze state and triggers its doze interval timer as shown by dashed line interval 132-3. A message for station 1 is transmitted during time interval 150, and the receipt thereof resulting in a data interrupt to the processor of station 1 as shown by arrow 152. The next TIM message, TIM-4, indicates that there are no messages for transmission to any of the stations. Consequently, all four stations return to the doze state until the expiry of their doze interval timers, as shown by dashed time intervals 130-4, 132-4,134-4, and 136-4.

The next TIM message, TIM-5, indicates that a broadcast message is to be sent, such a message being intended for reception by all the stations. Thus, upon receiving the message TIM-5, all four stations 1 to 4 remain awake for the duration of the next TIM interval. The broadcast message is transmitted during the time interval 160 and data interrupts are generated for stations 1 to 4 as shown by arrows 162, 164,166 and 168, respectively. The next TIM message, TIM-6, indicates that a message is to be transmitted to station 2. Thus, stations 1, 3 and 4 return to the doze state as shown by dashed line intervals 130-6, 134-6 and 136-6, whereas station 2 remains in the awake state for receipt of the message during time interval 170, a data interrupt being provided as shown by arrow 172.

It should be noted that the described procedure is self synchronizing, in that if a TIM message missed, e.g. through interference, a station which missed that message stays awake until the next TIM message, and synchronizes thereon. This is shown by the X mark 180 shown for station 4 which misses reception of TIM message TIM-7, but resynchronizes upon reception of TIM message TIM-8.

Figure 7:
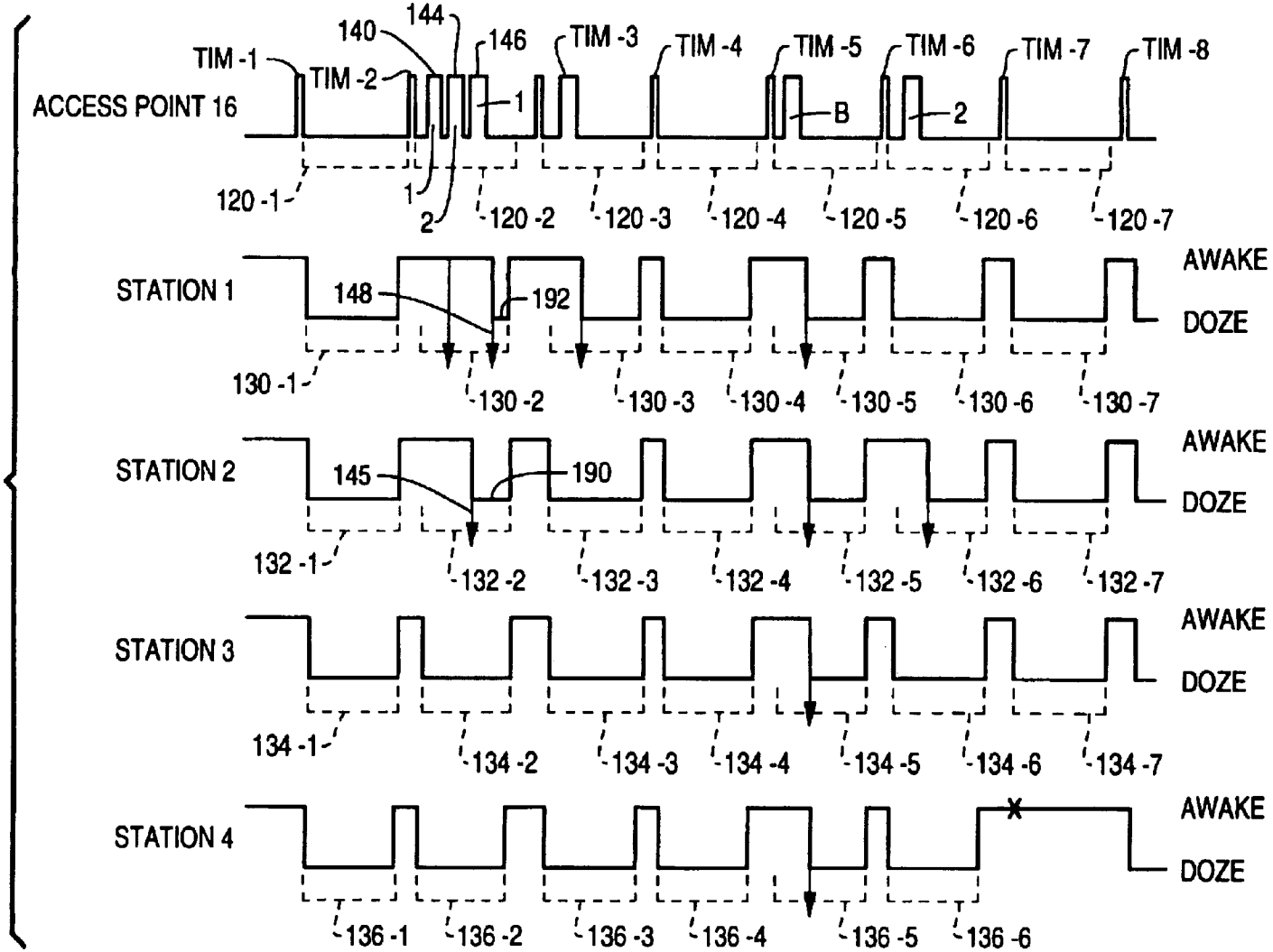
FIG. 7 is a timing diagram showing the alternation between doze and awake states of the mobile stations according to a second scheme.

The operation of the system in a second type of power-save mode, which is referred to as "back-to-doze" mode will now be briefly described with reference to FIGS. 5 and 7. FIG. 5 shows the format of the TIM message 90 for the "back-to-doze" mode. The TIM message 90 contains, as mentioned above, an indication of the number of messages destined for each station designated to receive messages in the TIM message. Since the operation in the back-to-doze mode is somewhat similar to the operation in the stay-awake mode, a full description is considered unnecessary, and only the differences will be briefly described. Thus, the TIM message TIM-2 indicates that two messages are to be transmitted to station 1 and one message to station 2. Such messages are transmitted during time intervals 140, 144 and 146. When station 2 has received its single message it returns to the doze state for the remainder of the current doze interval, as shown by level 190. Similarly, when station 1 has received its two messages, it returns to the doze state for the remainder of the doze interval, as shown by level 192. The subsequent operation of each station is similar, the doze state being resumed after reception of all the messages destined for that station for the remainder of the doze interval. It will, of course, be appreciated that in the back-to-doze mode, all messages that arrive at the access point 16 for wireless transmission to a station must be buffered at the access point until the next TIM message is sent.

Although, in the above description, it has been assumed that the stations 20 are operating in power-save mode throughout, it will be appreciated that it is possible that a station 20 can dynamically select to be in power-save mode or continuous-active mode, the access point 16 being informed of all mode changes. When a station 20 is operating in continuous-active mode, the message buffering system is by-passed and messages are sent to the station directly when they arrive. Where data traffic to a station is predictable to a certain extent, an automatic procedure may be employed to keep the station in continuous-active mode prior to the expected traffic, and return it to power-save mode when no further traffic is expected. Thus, for example, each time a station 20 sends a message (via the access point 16) it could be controlled to remain in continuous-active mode for a predetermined time, sufficient to allow for a response message to be received in normal circumstances. The access point 16, upon detecting that the station has sent a message, marks it as being a continuous-active mode and waits of the station to indicate explicitly that it has returned to power-save mode. The station, upon detecting that no further traffic is expected, or upon expiration of a fixed interval timer, sends an explicit message to the access point 16 to indicate a return to power-save mode, and the station then returns to power-save mode. In a modification, to avoid the transmission of an explicit message to the access point 16, the access point 16 and mobile station 20 can both utilize so-called holdover timers (described in more detail hereinbelow in connection with the second embodiment of the invention). The station 20, upon transmission of a data message, starts a holdover timer (not shown) and stays in continuous-active mode until the expiration of that timer. With each transmission, the timer is restarted. The access point 16 can employ a similar arrangement to know when a station 20 is still in continuous-active mode and when it has returned to power-save mode. It will be appreciated that when utilizing this modified procedure, the mobile station 20 will be interpreting TIM messages even while it is in continuous-active mode.

Figure 8:
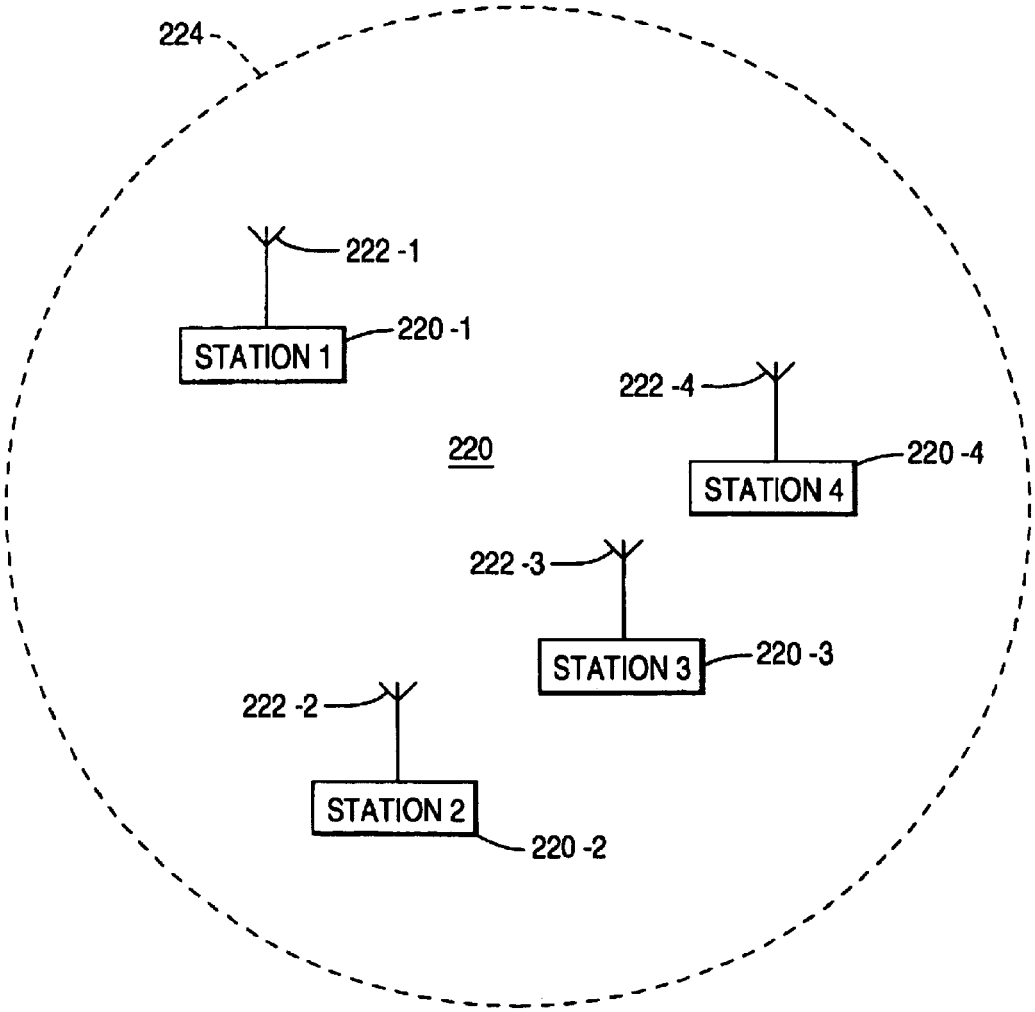
FIG. 8 shows a second embodiment of the invention including a plurality of mobile, battery-powered wireless stations disposed in a so-called "ad-hoc" network.

Referring now to FIG. 8, there is shown a second embodiment of the invention. The second embodiment relates to a so-called "ad-hoc" network 210, that is, a plurality of battery-powered mobile wireless stations 220, referenced individually as mobile wireless stations 220-1, 220-2, 220-3 and 220-4. These stations are situated within a coverage area or cell 224 such that all stations 220 can communicate directly with one another. The stations 220 have antennas 222, referenced individually as antennas 222-1, 222-2, 222-3 and 222-4.

Figure 9:
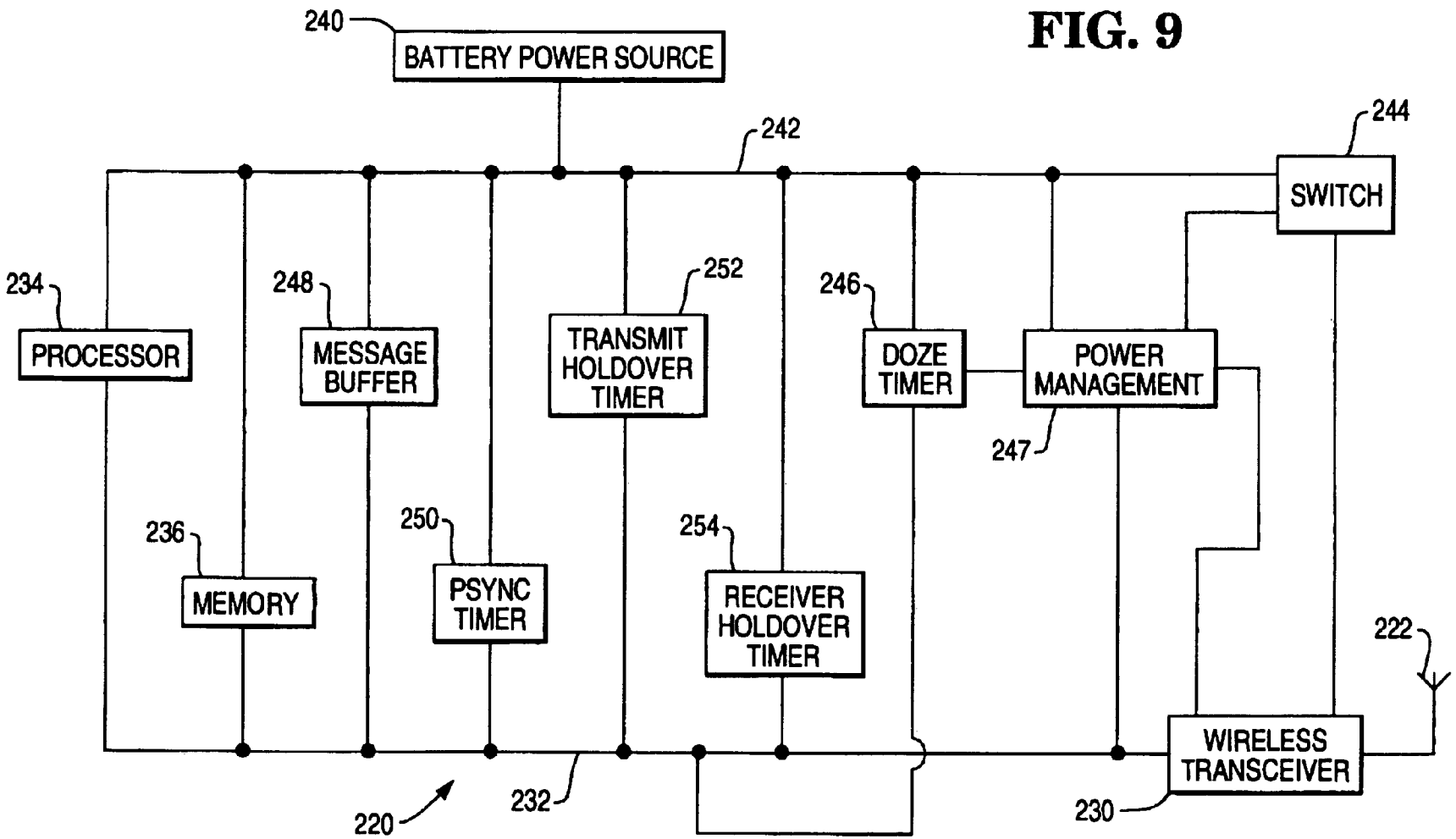
FIG. 9 is a block diagram of a typical wireless station shown in FIG. 8.

Referring to FIG. 9, there is shown a simplified block diagram of a mobile wireless station 220. The mobile station 220 includes a wireless transceiver 230 coupled to an antenna 222 and to a bus 232. The mobile station 220 also includes, connected to the bus 232, a processor 234, and a memory 236. Other devices such as a keyboard (not shown) and a display (not shown) may be connected to the bus 232 to enable the mobile station 220 to function as a hand-held data processing device. Other functions, such as a wireless hand-held scanner, are also possible for the station 220. The mobile station 220 is battery powered, and includes a battery power source 240 connected to a power line 242, which supplies power to the components of the mobile station. The power line 242 is connected to supply continuous power to the processor 234, memory 236 and other devices. However, power is supplied to the wireless transceiver 230 via a switch 244 which operates under the control of a doze timer 246 and power management circuit 247. It will be appreciated that the components of the mobile wireless station 220 described thus far correspond to components of the mobile wireless station 20 (FIG. 2). However, the mobile wireless station 220 also contains a message buffer 248 used to store messages, as will be described hereinafter, a PSYNC timer 250, a transmit holdover time 252 and a receive holdover timer 254.

In a similar manner to that described for the first embodiment, the mobile wireless station 220 can operate either in a power-save mode, or in a continuous-active mode. In the power-save mode, the station 220 can be in an awake state, in which it is fully operational, or in a doze state, in which the wireless transceiver 230 operates at a reduced power level.

The network 210 operates in accordance with a power saving scheme, the principles underlying which will now be described. At initial start-up, one of the stations 220, assumed here to be the station 220-1, will assume the role of master station, and commences to transmit PSYNC messages (to be described) at regular intervals. The PSYNC messages are broadcast messages and therefore received by all stations. Preferably, each station 220 initially listens for a PSYNC message for a predetermined time, and if none is received, assumes the role of master station. The PSYNC messages include a portion identifying the message as a PSYNC message and a source address portion identifying the station 220 transmitting the message. Only one station 220 will assume the role of master station and transmit PSYNC messages.

Figure 10:
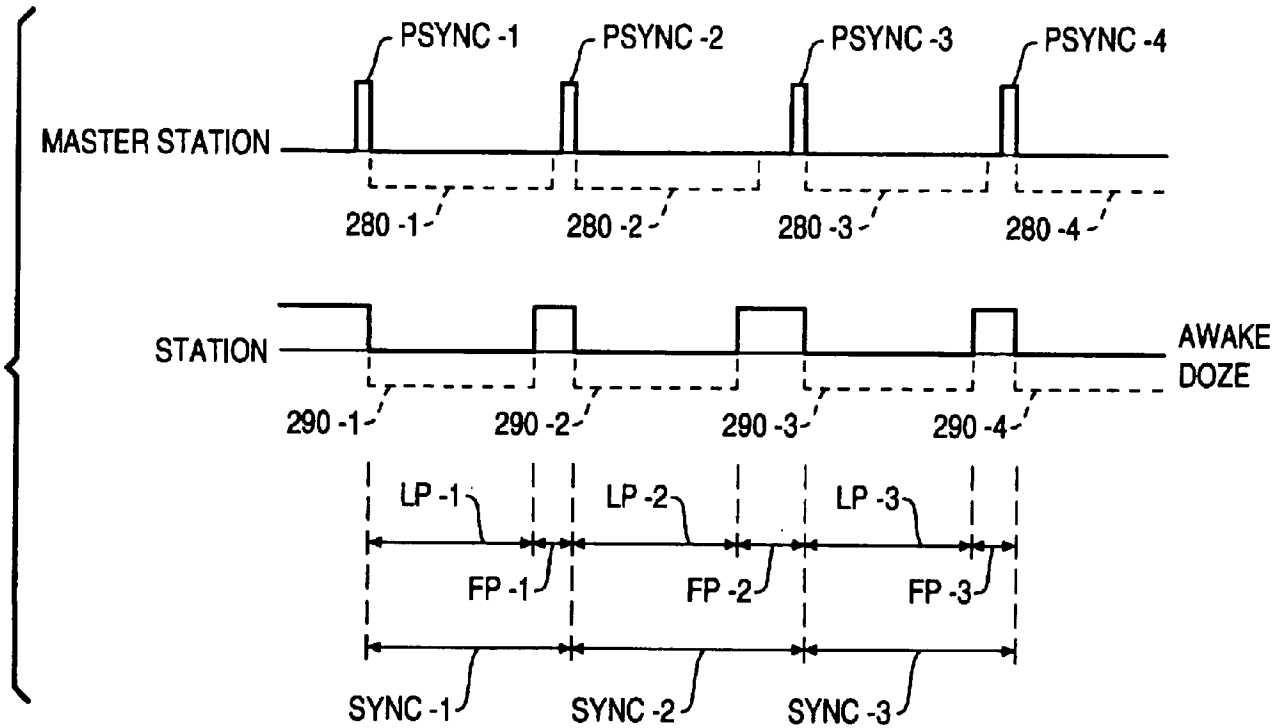
FIG. 10 is a timing diagram showing the structure of SYNC intervals utilized in the operation of the second embodiment of the invention.

Referring to FIG. 10, the generation by the master station of four PSYNC messages, identified as PSYNC-1 to PSYNC-4 is shown. It should be understood that after transmission of each PSYNC message, the PSYNC timer 250 (FIG. 9) is triggered at the master station to initiate a PSYNC timer interval 280, the respective PSYNC timer intervals being identified as 280-1 to 280-4 in FIG. 10. Upon the expiry of a PSYNC timer interval, the transmission of the next PSYNC message is normally initiated, although the actual transmission of such next PSYNC message may be slightly delayed, as will be explained hereinbelow.

The reception of a PSYNC message at stations 220 other than the master station triggers the doze timer 246 (FIG. 9) at those stations to initiate a doze interval of low power operation. The operating periods of the doze timer 246 are identified by the timing periods 290-1 to 290-4 shown in FIG. 10, the second line of which shows the doze and awake states of a station. Thus, the time dimension is split into approximately equal SYNC intervals shown for example as SYNC-1, SYNC-2 and SYNC-3 in FIG. 10. Each SYNC interval consists of a low-power period LP, shown as low-power periods LP-1 to LP-3 in FIG. 10, and a full-power period FP, shown as FP-1 to FP3 in FIG. 10. The start of a SYNC interval and the low-power period is the detection of the PSYNC message. The duration of the low-power periods is determined by the doze timer 246 providing doze intervals 290-1, 290-2, etc. The duration of the full-power periods FP-1, FP-2, etc. is determined by the difference between the PSYNC timer intervals and the station doze timer intervals, and (as will be explained hereinafter) by the amount of traffic in the network.

When a station 220 starts participation in the network 210, it is controlled to be in the awake state until it receives a PSYNC message. The reception of the PSYNC message triggers the doze timer 246 as previously mentioned to commence timing a doze interval, with a time interval shorter than that of the PSYNC timer, and the station goes into the doze state. The doze timer 246 is triggered after every PSYNC message reception. When the doze timer 246 expires, the station switches to the awake state and waits for messages to be received.

Figure 11:
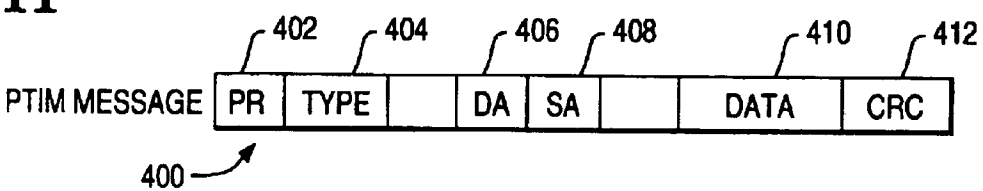
FIG. 11 is a diagram of a traffic indicator message utilized in the second embodiment.

A station 220 that wants to transmit one or more data messages to one or more other stations determines its position in the current SYNC interval. If it is in a low-power period such as LP-1 (FIG. 10), it waits until the doze timer 246 expires before transmitting, whereas if it is in a full-power period such as the period FP-1 (FIG. 10) it can immediately commence transmission. In either case, there are two possibilities. If the station has a single short message to transmit, this can be directly transmitted to the destination station. If it has a long message or a plurality of messages to transmit, it sends PTIM (peer-level traffic indicator) messages to all the stations it wishes to transmit to and then waits until a PSYNC message is received and effects transmission of pending messages stored in its message buffer 248 (FIG. 9). A PTIM message includes an identification portion indentifying the message as a PTIM message and an identification of source and destination addresses of data messages to be transmitted by the source station. Referring to FIG. 11, there is shown the basic structure of a PTIM message 400. The PTIM message 400 includes a preamble portion 402, a type portion identifying the PTIM message as such, a destination address portion 406, a source address portion 408, an (optional) data portion 410 and a CRC check portion 412. The PTIM message 400 may contain other portions which are not relevant to the present invention and are therefore not described herein.

Returning to the operation of a station which does not have messages to transmit, such a station, upon the expiry of its doze timer 246, goes into the awake state and waits for messages. There are three possibilities. The first possibility is that the first message that the station receives is a PSYNC message. This means that there is no message waiting for it, and the station returns to the doze state. The second possibility is that the station receives one or more PTIM messages. This means that one or more messages are waiting for it. The station then stays in the awake state after the PSYNC message is received until it receives the indicated messages from the issuers of all the received PTIM messages. It then returns to the doze state unless it happens to be in a full-power period, in which case the station waits for a next PSYNC message or a data message. When the receipt of data messages extends over several SYNC intervals, the doze timer 246 is restarted after each PSYNC message, in the normal way, but does not return the station to the doze state. This enables the station to stay synchronized.

The third possibility for the station waiting to receive messages is that the station receives a (short) data message, transmitted as described hereinabove. The station then stays in the awake state until it receives a PSYNC message, whereafter it returns to the doze state in the usual way.

Figure 12:
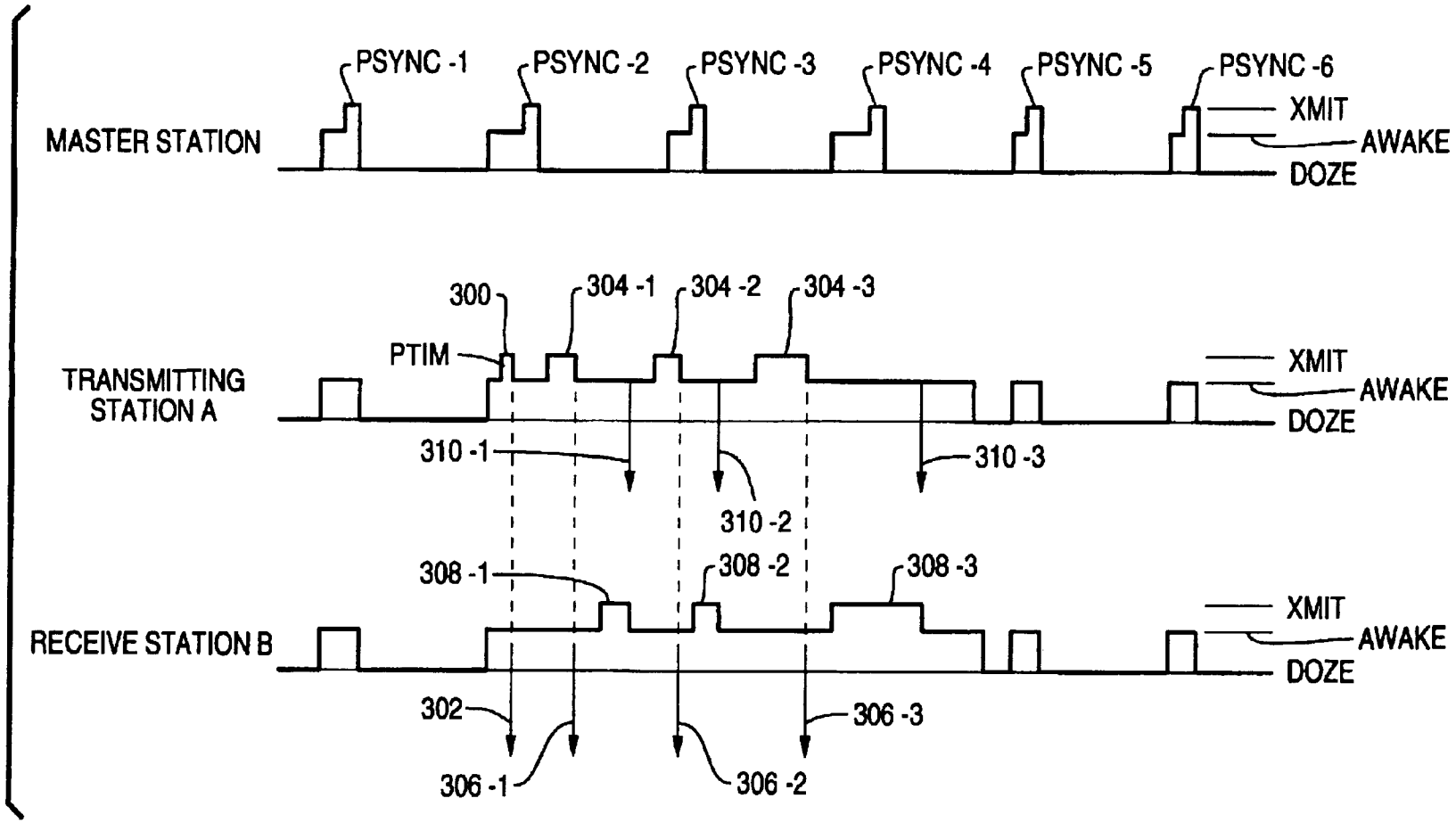
FIG. 12 is a timing diagram showing the doze and awake states of stations participating in an exchange of data messages.

The above operation is illustrated in FIG. 12. Thus, the first line of FIG. 12 shows a succession of six PSYNC messages transmitted by the master station. Note that the master station goes into the doze state after the transmission of each PSYNC message unless it received a PTIM message. After the transmission of the first PSYNC message PSYNC-1 and before the transmission of the second PSYNC message PSYNC-2, it is assumed that one of the other stations 220, identified as transmitting station A, wishes to transmit data messages to another of the stations 220, identified as receiving station B. The station A therefore transmits a PTIM message to destination station B. Station A then stays in the continuous active mode for a period of time, referred to as the transmit holdover time, during which it does not revert to the doze state. Thus, station B can transmit data messages (such as acknowledgement messages) immediately as they become available and does not have to use the PTIM synchronization procedure. The receiving station B also applies a holdover procedure by not going back to the doze state. For this purpose the station 220 (FIG. 9) includes the transmit holdover timer 252 which is restarted after each transmission. Similarly, the receive holdover timer 254 is started after each receipt of a message.

When station B receives the PTIM message 300 (FIG. 12) it provides a PTIM interrupt 302 to its processor. Station A transmits a first data message 304-1 to station B, which provides a data interrupt 306-1 to its processor. Station B then transmits a message 308-1 (which may be a response or an acknowledgement message) to station A (which is maintained in the awake state as discussed previously). Station A then issues a data interrupt 310-1 to its processor. Next station A transmits a second message 304-2 to station B, which provides a second data interrupt 306-2 to its processor. Station B then transmits a second message 308-2. The sequence of message transmission and data interrupts continues as shown, with the third data message 308-3 transmitted by station B being the last transmitted data message.

It will be appreciated that if there are no data messages pending at a station at the end of a low power period LP (FIG. 10) of a particular SYNC interval, the next PSYNC message should be transmitted as soon as possible so as to keep the full-power period FP a short as possible. Thus, the difference between the time-out periods of the PSYNC timer 250 (FIG. 9) and the doze timer 246 (FIG. 9), as represented, for example, by the timing intervals 280-1 and 290-1 in FIG. 10, can be very short, as a percentage of the SYNC interval. If there are more PTIM messages to be transmitted than the normal full-power period FP would allow, it is advantageous to lengthen the full-power period, that is, delay the transmission of the next PSYNC message. Since the master station has no knowledge of what is pending at the other stations, this lengthening of the full-power period is effected by means of a medium access priority scheme, wherein PTIM messages and direct data messages are given higher access priority than PSYNC messages. This can be done where a CSMA/CA (carrier select multiple access with collision avoidance) medium access protocol is utilized, for example, by providing a relatively long back-off period for the master station if the master station senses the medium as busy when it attempts to transmit a PSYNC message.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of operating a wireless data communication system including a plurality of wireless stations, comprising the steps of:

broadcasting synchronizing messages from a selected station of the plurality of stations;

identifying which of a number of non-selected stations of the plurality of stations are to receive data messages by transmitting traffic indicator information from the selected station, wherein at least two non-selected stations were identified in the identifying step;

operating the non-selected stations in an awake state of relatively high power consumption during the broadcasting step and the identifying step;

changing the operating state of non-selected stations that were not identified in the identifying step to a doze state of relatively low power consumption after the broadcasting step and the identifying step is performed;

maintaining all non-selected stations that were identified in the identifying step in the awake state for at least a time period beginning immediately after completion of the operating step so that one or more data messages are able to be transmitted to the non-selected stations which were identified in the identifying steps transmitting all data messages exchanged between the non-selected stations via the [selection] *selected* station;

including in the synchronizing messages destination identifying portions identifying non-selected stations that are to receive data messages;

including in the synchronizing messages a count portion identifying the number of data messages to be transmitted to the respective non-selected stations that are to receive data messages; and returning the non-selected stations to the doze state after the respective number of data messages have been received.

2. A method according to claim 1, wherein the selected station is an access point communicating with a wired LAN.

3. A method according to claim 1, further comprising the step of maintaining the non-selected stations that are to receive data messages in the awake state at least until the reception of a next one of the synchronizing messages.

4. A method according to claim 1, further comprising the step of transmitting from the selected station traffic indicator messages identifying a source address of the selected station and a destination address of each data message to be sent from the selected station.

5. A method according to claim 4, wherein the traffic indicator messages are transmitted when the selected station is in the awake state.

6. A method according to claim 1, further comprising the step of:

operating the non-selected stations selectively in a power-save mode wherein the doze states and the awake states alternate, or in a continuous-active mode wherein the awake state is continuously effective.

7. A wireless data communication system, comprising:

a selected wireless data communication station having a synchronizing timing means adapted to control transmission of synchronizing messages by said selected station;

means for transmitting traffic indicator information, in association with the synchronizing messages, that identify data message destinations;

a number of non-selected wireless data communication stations each having a switching means, a power supply, and a station transceiver means, wherein the switching means is adapted to control the power supply which is supplied to the station transceiver means so that the non-selected stations are controlled to be in an awake state of relatively high power consumption to receive the synchronizing messages and the traffic indicator messages, and following receipt of the synchronizing messages and the traffic indicator information (1) any non-selected stations having no data messages destined therefor are changed to a doze state of relatively low power consumption, and (2) all non-selected stations having data messages destined therefor are maintained in the awake state for a time period beginning immediately after receiving the synchronizing messages and the traffic indicator messages;

wherein said selected station is an access point communicating with a backbone LAN, and further wherein the synchronizing messages include destination identifying portions identifying stations that are to receive data messages; and wherein the synchronizing messages include count information identifying the number of data messages to be transmitted to the respective non-selected stations, and further wherein the switching means is controlled to return the respective [non-selective] *non-selected* stations to the doze state when the specified number of data messages have been received.

8. A wireless data communication system according to claim 7, wherein the switching means of non-selected stations identified to receive data messages are controlled to remain in the awake state at least until a next one of the synchronizing messages has been received.

9. A wireless data communication system according to claim 7, wherein said selected station is adapted to transmit traffic indicator messages identifying a source address of the selected station and a destination address of each data message to be sent from the selected station.

10. A method of operating a wireless data communication system including a plurality of wireless data communication stations communicating directly in an ad-hoc network, wherein at least one of the plurality of wireless data communication stations acts as a master station and the remainder of the plurality of wireless data communication stations act as slave stations, said method comprising:

broadcasting a synchronizing message by the master station in accordance with a synchronization timer, wherein the slave stations remain in an awake state;

entering a doze state by the slave stations once the synchronizing message from the master station is received;

transmitting a traffic message by a slave station that has messages to broadcast, if the slave station is in the awake state;

wherein the traffic message is stored in a buffer of the slave station that has messages to broadcast and the traffic message is transmitted to all stations to which the slave station wishes to transmit, wherein a holdover timer ensures the slave station remains in the awake state until all the message are broadcast.

11. The method of claim 10, wherein if the slave station that has messages to broadcast is in the doze state, the slave station waits to transmit the traffic message until a doze timer expires.

12. The method of claim 10, wherein the synchronizing messages include count information identifying the number of data messages to be transmitted to all stations to which the slave station wishes to transmit, and further all stations to which the slave station wishes to transmit are returned to the doze state when the messages have been received.

13. The method of claim 10, wherein a holdover timer permits the slave station that has messages to broadcast and all stations to which the slave station wishes to transmit to remain in the awake state been after a synchronizing message is received.

14. A wireless data communication system including a plurality of wireless data communication stations communicating directly in an ad-hoc network, wherein at least one of the plurality of wireless data communication stations acts as a master station and the remainder of the plurality of wireless data communication stations act as slave stations, wherein said system:

said master station broadcasts a synchronizing message in accordance with a synchronization timer, wherein the slave stations remain in an awake state;

said slave stations enter a doze state once the synchronizing message from the master station is received;

a slave station than has messages to broadcast transmits a traffic message, if the slave station is in the awake state;

wherein the traffic message is stored in a buffer of the slave station that has messages to broadcast and the traffic message is transmitted to all stations to which the slave station wishes to transit, wherein a holdover timer ensures the slave station remains in the awake state until all the message are broadcast.

15. The system of claim 14, wherein if the slave station that has messages to broadcast is in the doze state, the slave station waits to transmit the traffic message until a doze timer expires.

16. The system of claim 14, wherein the synchronizing messages include count information identifying the number of data messages to be transmitted to all stations to which the slave station wishes to transmit, and further wherein all stations to which the slave station wishes to transmit are returned to the doze state when the specified number of data messages have been received.

17. The system of claim 14, wherein a holdover timer permits the slave station that has messages to broadcast and all stations to which the slave station wishes to transmit to remain in the awake state even after a synchronizing message is received.

*18. A method of operating a wireless data communication system including a plurality of wireless stations, comprising the steps of:*

*broadcasting synchronizing messages from a selected station of the plurality of stations;*

*identifying which of a number of non-selected stations of the plurality of stations are to receive data messages by transmitting traffic indicator information from the selected station, wherein at least two non-selected stations were identified in the identifying step;*

*operating the non-selected stations in an awake state of relatively high power consumption during the broadcasting step and the identifying step;*

*changing the operating state of non-selected stations that were not identified in the identifying step to a doze state of relatively low power consumption after the broadcasting step and the identifying step is performed;*

*maintaining all non-selected stations that were identified in the identifying step in the awake state for at least a time period beginning immediately after completion of the operating step so that one or more data messages are able to be transmitted to the non-selected stations which were identified in the identifying step;*

*transmitting all data messages exchanged between the non-selected stations via the selected station;*

*including in the synchronizing messages destination identifying portions identifying non-selected stations that are to receive data messages;*

*further including in the synchronizing messages header portions and broadcast message indicator portions to be transmitted to the respective non-selected stations that are to receive data messages; and*

*returning the non-selected stations to the doze state.*

*19. The method of claim 18, wherein said broadcast message indicator portions indicate that a broadcast message is buffered at the selected station.*

*20. The method of claim 18, further including in the synchronizing messages, a check portion.*

*21. The method of claim 20, wherein the check portion is a cyclic redundancy code (CRC).*

*22. A wireless data communication system, comprising:*

*a selected wireless data communication station having a synchronizing timer adapted to control transmission of synchronizing messages by said selected station, wherein the selected station is adapted to transmit traffic indicator information, in association with the synchronizing messages, that identify data message destinations; and*

*a number of non-selected wireless data communication stations each having a switching device, a power supply, and a station transceiver, wherein the switching device is adapted to control the power supply which is applied to the station transceiver so that the non-selected stations are controlled to be in an awake state of relatively high power consumption to receive the synchronizing messages and the traffic indicator information, and following receipt of the synchronizing messages and the traffic indicator information (1) any non-selected stations having no data messages destined therefor are changed to a doze state of relatively low power consumption, and (2) all non-selected stations having data messages destined therefor are maintained in the awake state for a time period beginning immediately after receiving the synchronizing messages and the traffic indicator information;*

*wherein said selected station is an access point, and further wherein the synchronizing messages include destination identifying portions identifying stations that are to receive date messages; and*

*wherein the synchronizing messages further include header portions and broadcast message indicator portions to be transmitted to the respective non-selected stations, and further wherein the switching device is controlled to return the respective non-selected stations to the doze state.*

*23. The wireless data communication system of claim 22, wherein said broadcast message indicator portions indicate that a broadcast message is buffered at the selected wireless data communication station.*

*24. The wireless data communication system of claim 22, wherein the synchronizing messages further include a check portion.*

*25. The wireless data communication system of claim 24, wherein the check portion is a cyclic redundancy code (CRC).*

*26. The wireless data communication system of claim 22, the selected station including an interval timer initiated after each transmission of a synchronizing message and such that the transmission of a new synchronizing message is initiated after expiry of the interval timer.*

*27. The wireless data communication system of claim 22, the selected station including a transceiver and a wireless transceiver, the transceiver adapted for connecting the selected station to a backbone LAN and the wireless transceiver adapted for connecting the selected station to a wireless LAN.*

*28. The wireless data communication system of claim 22, each non-selected wireless data communication station including a doze timer with a doze interval selected such that each non-selected wireless data communication station is in the awake state prior to the next synchronizing message.*

*29. The wireless data communication system of claim 22, wherein each non-selected wireless data communication station cannot receive or transmit messages in the doze state.*

*30. The wireless data communication system of claim 22, wherein power consumption in the doze state is up to 90% less than in the awake state.*

*31. A method of operating a mobile wireless station, comprising the steps of:*

*receiving periodically transmitted synchronizing messages broadcast from an access point, the synchronizing messages including destination identifying portions, header portions and broadcast message indicator portions;*

*determining whether the mobile wireless station is to receive a data message by receiving traffic indicator information transmitted from the access point;*

*operating the mobile wireless station in an awake state of relatively high power consumption during the receiving step and the determining step;*

*changing the operating state of the mobile wireless station of a doze state to relatively low power consumption after the receiving step and the determining step are performed if the mobile wireless station is not to receive a data message; and*

*maintaining the operating state of both transmitter and receiver functions of the mobile wireless station in the awake state for at least a time period beginning immediately after completion of the operating step so that one or more data massages are able to be transmitted to the mobile wireless station if the mobile wireless station is to receive a data message, wherein:*

*the mobile wireless station receives one or more data messages via the access point; and*

*the mobile wireless station returns to the doze state after receiving the one or more data messages via the access point before receiving another synchronization message.*

*32. The method of claim 31, wherein after returning to the doze state, the mobile station returns to the awake state prior to the time that the next periodically transmitted synchronizing message is received.*

*33. The method of claim 31, further comprising:*

*triggering a doze interval timer in the mobile wireless station upon receipt of the periodically transmitted synchronizing messages broadcast from the access point and*

*returning the mobile wireless station to an awake state of relatively high power after the doze interval ends such that the mobile wireless station can receive the next periodically transmitted synchronizing message.*

*34. A mobile wireless station, comprising:*

*a station transceiver that receives and transmits messages; and*

*a switching device that can switch the mobile wireless station between an awake state of relatively high power consumption so that the station transceiver is capable of receiving messages, and a doze state of relatively low power consumption,*

*wherein the switching device causes the mobile wireless station to be in an awake stage to receive periodically transmitted synchronizing messages containing traffic indicator information from an access point, wherein the synchronizing messages further include header portions, broadcast message indicator portions, and destination identifying portions, and*

*wherein the switching device causes the mobile wireless station to be in the doze state following receipt of the synchronizing messages if the traffic indicator information indicates that no data messages are to be transmitted by the access point to the mobile wireless station, and wherein the switching device causes both transmitter and receiver functions of the mobile wireless station to remain in the awake state for a time period beginning immediately after receiving the synchronizing messages and the traffic indicator information if the traffic indicator information indicates that data messages are to be transmitted by the access point to the mobile wireless station.*

*35. The mobile wireless station of claim 34, said switching device including,*

*a switch adapted to couple power to the station transceiver,*

*a power management circuit adapted to control the switch, and*

*a doze timer adapted to cause the power management circuit to periodically initiate an awake state to receive the periodically transmitted synchronizing messages.*

*36. The mobile wireless station of claim 35, wherein the power management circuit wakes up the mobile wireless station after a doze interval of the doze timer ends so that the mobile wireless can receive the next periodically transmitted synchronizing message.*

*37. The mobile wireless station of claim 35, the doze timer having a doze interval selected such that the mobile wireless station is in the awake state prior to the next periodically transmitted synchronizing message.*

*38. The mobile wireless station of claim 37, wherein the mobile wireless station cannot receive or transmit messages in the doze state.*

*39. The mobile wireless station of claim 37, wherein power consumption in the doze state is up to 90% less than in the awake state.*

*40. A mobile wireless station, comprising:*

*a station transceiver that receives and transmits messages; and*

*a switching device that can switch the mobile wireless station between an awake state of relatively high power consumption so that the station transceiver is capable of receiving messages, and a doze state of relatively low power consumption,*

*wherein the switching device causes the mobile wireless station to be in an awake state to receive periodically transmitted synchronizing messages containing traffic indicator information from an access point, wherein the synchronizing messages further include header portions, broadcast message indicator portions, and destination identifying portions, and*

*wherein the switching device causes the mobile wireless station to be in the doze state following receipt of the synchronizing messages if the traffic indicator information indicates that no data messages are to be transmitted by the access point to the mobile wireless station, and wherein the switching device causes both transmitter and receiver functions of the mobile wireless station to remain in the awake state for a time period beginning immediately after receiving the synchronizing messages and the traffic indicator information if the traffic indicator information indicates that data messages are to be transmitted by the access point to the mobile wireless station.*

*41. The mobile wireless station of claim 40, said switching device including,*

*a switch adapted to couple power to the station transceiver,*

*a power management circuit adapted to control the switch, and*

*a doze timer adapted to cause the power management circuit to periodically initiate an awake state to receive the periodically transmitted synchronizing messages.*

*42. The mobile wireless station of claim 41, wherein the power management circuit wakes up the mobile wireless station after a doze interval of the doze timer ends so that the mobile wireless can receive the next periodically transmitted synchronizing message.*

*43. The mobile wireless station of claim 41, the doze timer having a doze interval selected such that the mobile wireless station is in the awake state prior to the next periodically transmitted synchronizing message.*

*44. The mobile wireless station of claim 43, wherein the mobile wireless station cannot receive or transmit messages in the doze state.*

*45. The mobile wireless station of claim 43, wherein power consumption in the doze state is up to 90% less than in the awake state.*

*46. A method of operating a wireless data communication system including a plurality of wireless stations, comprising the steps of:*

*broadcasting synchronizing messages from a selected station of the plurality of stations;*

*identifying which of a number of non-selected stations of the plurality of stations are to receive data messages by transmitting traffic indicator information from the selected station, wherein at least two non-selected stations were identified in the identifying step;*

*operating the non-selected stations in an awake state of relatively high power consumption during the broadcasting step and the identifying step;*

*changing the operating state of non-selected stations that were not identified in the identifying step to a doze state of relatively low power consumption after the broadcasting step and the identifying step is performed;*

*maintaining all non-selected stations that were identified in the identifying step in the awake state for at least a time period beginning immediately after completion of the operating step so that one or more data messages are able to be transmitted to the non-selected stations which were identified in the identifying steps*

*transmitting all data messages exchanged between the non-selected stations via the selected station;*

*including in the synchronizing messages destination identifying portions identifying non-selected stations that are to receive data messages;*

*further including in the synchronizing messages header portions and broadcast message indicator portions, to be transmitted to the respective non-selected that are to receive data messages; and*

*returning the non-selected stations to the doze state after indicating such a mode change to the selected station.*

*47. A wireless data communication system, comprising:*

*a selected wireless data communication station having a synchronizing timer adapted to control transmission of synchronizing messages by said selected station, wherein the selected station is adapted to transmit traffic indicator information, in association with the synchronizing messages, that identify data message destinations; and*

*a number of non-selected wireless data communication stations each having a switching device, a power supply, and a station transceiver, wherein the switching device is adapted to control the power supply which is applied to the station transceiver so that the non-selected stations are controlled to be in an awake state of relatively high power consumption to receive the synchronizing messages and the traffic indicator information, and following receipt of the synchronizing messages and the traffic indicator information (1) any non-selected stations having no data messages destined therefor are changed to a doze state of relatively low power consumption, and (2) all non-selected stations having data messages destined therefor are maintained in the awake state for a time period beginning immediately after receiving the synchronizing messages and the traffic indicator information;*

*wherein said selected station is an access point, and further wherein the synchronizing messages include destination identifying portions identifying stations that are to receive data messages; and*

*wherein the synchronizing messages further include header portions and broadcast message indicator portions, to be transmitted to the respective non-selected stations that are to receive data messages, and further wherein the switching divide is controlled to return the respective non-selected stations to the doze state after indicating such a mode change to the selected station.*

*48. The wireless data communication system of claim 47, the selected station including an interval timer initiated after each transmission of a synchronizing message and such that the transmission of a new synchronizing message is initiated after expiry of the interval timer.*

*49. The wireless data communication system of claim 47, the selected station including a transceiver and a wireless transceiver, the transceiver adapted for connecting the selected station to a backbone LAN and the wireless transceiver adapted for connecting the selected station to a wireless LAN.*

*50. The wireless data communication system of claim 47, each non-selected wireless data communication station including a doze timer with a doze interval selected such that each non-selected wireless data communication station is in the awake state prior to the next synchronizing message.*

*51. The wireless data communication system of claim 47, wherein each non-selected wireless data communication station cannot receive or transmit messages in the doze state.*

*52. The wireless data communication system of claim 47, wherein power consumption in the doze state is up to 90% less than in the awake state.*

*53. A method of operating a mobile wireless station, comprising the steps of:*

*receiving periodically transmitted synchronizing messages broadcast from an access point;*

*determining whether the mobile wireless station is to receive a data message by receiving traffic indicator information transmitted from the access point;*

*operating in an awake state of relatively high power consumption during the receiving step and the determining step;*

*changing the operating state to a doze state of relatively low power consumption after the receiving step and the determining step are performed if the mobile wireless station is not to receive a data message; and*

*maintaining the operating state of both transmitter and receive functions of the mobile wireless station in the awake state for at least a time period beginning immediately after completion of the operating step so that one or more data messages are able to be transmitted to the mobile wireless station if the mobile wireless station is to receive a data message wherein the mobile wireless station receives one or more data messages via the access point and remains in the awake state at least until the next synchronization message is received.*

*54. A mobile wireless station, comprising:*

*a station transceiver that receives and transmits messages; and*

*a switching device, that can switch the mobile wireless station between an awake state of relatively high power consumption so that the station transceiver is capable of receiving messages, and a doze state of relatively low power consumption*

*wherein the switching device causes the mobile wireless station to be in an awake state to receive periodically transmitted synchronizing messages containing traffic indicator information from an access point;*

*wherein the switching device causes the mobile wireless station to be in the doze state following receipt of the*

*periodically transmitted synchronizing messages if the traffic indicator information indicates that no data messages are to be transmitted by the access point to the mobile wireless station and wherein the switching device causes both transmitter and receiver functions of the mobile wireless station to remain in an awake state until the next synchronizing message is received if the mobile wireless station has received a message in the current synchronizing period.*

*55. The mobile wireless station of claim 54, said switching device including,*

*a switch adapted to couple power to the station transceiver,*

*a power management circuit adapted to control the switch, and*

*a doze timer adapted to cause the power management circuit to periodically initiate an awake state to receive the periodically transmitted synchronizing messages.*

*56. The mobile wireless station of claim 55, wherein the power management circuit wakes up the mobile wireless station after a doze interval of the doze timer ends so that the mobile wireless can receive the next periodically transmitted synchronizing message.*

*57. The mobile wireless station of claim 55, the doze timer having a doze interval selected such that the mobile wireless station is in the awake state prior to the next periodically transmitted synchronizing message.*

*58. The mobile wireless station of claim 57, wherein the mobile wireless station cannot receive or transmit messages in the doze state.*

*59. The mobile wireless station of claim 57, wherein power consumption in the doze state is up to 90% less than in the awake state.*

*60. A mobile wireless station, comprising:*

*a station transceiver that receives and transmits messages; and*

*a switching device, that can switch the mobile wireless station between an awake state of relatively high power consumption so that the station transceiver is capable of receiving messages, and a doze state of relatively low power consumption*

*wherein the switching device causes the mobile wireless station to be in an awake state to receive periodically transmitted synchronizing messages containing traffic indicator information from an access point;*

*wherein the switching device causes the mobile wireless station to be in the doze state following receipt of the periodically transmitted synchronizing messages if the traffic indicator information indicates that no data messages are to be transmitted by the access point to the mobile wireless station and wherein the switching device causes both transmitter and receiver functions of the mobile wireless station to remain in an awake state until the next synchronizing message is received if the mobile wireless station has received a message in the current synchronizing period.*

*61. The mobile wireless station of claim 60, said switching device including,*

*a switch adapted to couple power to the station transceiver,*

*a power management circuit adapted to control the switch, and*

*a doze timer adapted to cause the power management circuit to periodically initiate an awake state to receive the periodically transmitted synchronizing messages.*

*62. The mobile wireless station of claim 61, wherein the power management circuit wakes up the mobile wireless station after a doze interval of the doze timer ends so that the mobile wireless can receive the next periodically transmitted synchronizing message.*

*63. The mobile wireless station of claim 61, the doze timer having a doze interval selected such that the mobile wireless station is in the awake state prior to the next periodically transmitted synchronizing message.*

*64. The mobile wireless station of claim 63, wherein the mobile wireless station cannot receive or transmit messages in the doze state.*

*65. The mobile wireless station of claim 63, wherein power consumption in the doze state is up to 90% less than in the awake state.*

*66. A method of operating a wireless data communication system including a plurality of wireless stations, comprising the steps of:*

*broadcasting synchronizing messages from a selected station of the plurality of stations;*

*identifying which of a number of non-selected stations of the plurality of stations are to receive data messages by transmitting traffic indicator information from the selected station, wherein at least two non-selected stations were identified in the identifying step;*

*operating the non-selected stations in an awake state of relatively high power consumption during the broadcasting step and the identifying step;*

*changing the operating state of non-selected stations that were not identified in the identifying step to a doze state of relatively low power consumption after the broadcasting step and the identifying step is performed;*

*maintaining all non-selected stations that were identified in the identifying step in the awake state for at least a time period beginning immediately after completion of the operating step so that one or more data messages are able to be transmitted to the non-selected stations which were identified in the identifying steps*

*transmitting all data messages exchanged between the non-selected stations via the selected station;*

*including in the synchronizing messages destination identifying portions identifying non-selected stations that are to receive data messages;*

*further including in the synchronizing messages message indicator portions indicating that additional messages await transmission to the respective non-selected stations that are to receive data messages; and*

*returning the non-selected stations to the doze state when the respective non-selected stations that are to receive data messages determine that no additional data messages await.*

*67. A method of operating a wireless data communication system, comprising the steps of:*

*broadcasting periodically transmitted synchronizing messages from an access point to a plurality of mobile stations,*

*operating the plurality of mobile stations in an awake state of relatively high power consumption during the broadcasting step;*

*identifying which of the plurality of mobile stations are to receive data messages;*

*changing the operating state of the mobile stations that were not identified to a doze state of relatively low power consumption after the broadcasting step and identifying steps are performed;*

*maintaining the mobile stations that were identified in the awake state for at least a time period beginning immediately after completion of the operating step so that one or more data messages are able to be transmitted to the mobile stations that were identified;*

*transmitting all data messages for the mobile stations that were identified via the access point;*

*returning the mobile stations that were identified to the doze state when the mobile stations that were identified determine that no additional data messages await, wherein both transmitter and receiver functions of each identified station are maintained in the awake state for at least the time period beginning immediately after the completion of the operating step.*

*68. The method of claim 67, wherein the identifying step utilizes destination identifying information to identify which of the plurality of mobile stations are to receive data messages from the access point.*

*69. The method of claim 68, wherein the destination identifying information is contained in the periodically transmitted synchronizing message.*

*70. The method of claim 67, wherein the returning step utilizes a message indicator portion to determine that no additional messages await transmission to the mobile stations that were identified.*

*71. The method of claim 70, wherein the message indicator portion is contained in the periodically transmitted synchronizing message.*

*72. The method of claim 71, wherein the message indicator portion is a count portion identifying the number of messages the mobile stations that were identified are to receive.*

*73. A wireless data communication system, comprising:*

*a selected wireless data communication station having a synchronizing timer adapted to control transmission of synchronizing messages by said selected station, wherein the selected station is adapted to transmit traffic indicator information, in association with the synchronizing messages, that identify data messages destinations; and*

*a number of non-selected wireless data communication stations each having a switching device, a power supply, and a station transceiver, wherein the switching device is adapted to control the power supply which is applied to the station transceiver so that the non-selected stations are controlled to be in an awake state of relatively high power consumption to receive the synchronizing messages and the traffic indicator information, and following receipt of the synchronizing messages and the traffic indicator information (1) any non-selected stations having no data messages destined therefor are changed to a doze state of relatively low power consumption, and (2) all non-selected stations having data messages destined therefor are maintained in the awake state for a time period beginning immediately after receiving the synchronizing messages and the traffic indicator information;*

*wherein said selected station is an access point, and further wherein the synchronizing messages include destination identifying portions identifying stations that are to receive data messages; and*

*wherein the synchronizing messages message indicator portions indicating the additional messages await transmission to the respective non-selected stations, and further wherein the switching device is controlled to return the respective non-selected station to the doze state when the respective non-selected station that is to receive one or more data messages determines that no additional data messages await.*

*74. The wireless data communication system of claim 73, the selected station including an interval timer initiated after each transmission of a synchronizing message and such that the transmission of a new synchronizing message is initiated after expiry of the interval timer.*

*75. The wireless data communication system of claim 73, the selected station including a transceiver and a wireless transceiver, the transceiver adapted for connecting the selected station to a backbone LAN and the wireless transceiver adapted for connecting the selected station to a wireless LAN.*

*76. The wireless data communication system of claim 73, each non-selected wireless data communication station including a doze timer with a doze interval selected such that each non-selected wireless data communication station is in the awake state prior to the next synchronizing message.*

*77. The wireless data communication system of claim 73, wherein each non-selected wireless data communication station cannot receive or transmit messages in the doze state.*

*78. The wireless data communication system of claim 73, wherein power consumption in the doze state is up to 90% less than in the awake state.*

*79. A wireless data communication system, comprising:*

*an access point, broadcasting periodically transmitted synchronizing messages;*

*a plurality of mobile stations, receiving the periodically transmitted synchronizing messages broadcast by the access point, the plurality of mobile stations operating in an awake state of relatively high power consumption during broadcasting by the access point, the plurality of mobile stations identifying which are to receive data messages,*

*wherein the plurality of mobile stations that were not identified change to a doze state of relatively low power consumption and the plurality of mobile stations that were identified stay in the awake state for a time period beginning immediately after receiving each synchronizing message so that one or more data messages are able to be transmitted to the plurality of mobile stations that were identified;*

*the access point transmitting all data messages for the plurality of mobile stations that were identified;*

*the mobile stations that were identified returning to the doze state when the mobile stations that were identified determine that no additional data messages await; and*

*both transmitter and receiver functions of each identified mobile station stay in the awake state for the time period beginning immediately after receiving each synchronizing message.*

*80. The wireless data communication system of claim 79, wherein the plurality of mobile stations utilize destination identifying information to identify which of the plurality of mobile stations are to receive data messages from the access point.*

*81. The wireless data communication system of claim 80, wherein the destination identifying information is contained in the periodically transmitted synchronizing message.*

*82. The wireless data communication system of claim 79, wherein the mobile stations that were identified utilize a message indicator portion to determine that no additional messages await transmission to the mobile stations that were identified.*

*83. The wireless data communication system of claim 82, wherein the message indicator portion is contained in the periodically transmitted synchronizing message.*

*84. The wireless data communication system of claim 83, wherein the message indicator portion is a count portion identifying the number of messages the mobile stations that were identified are to receive.*

*85. The wireless data communication system of claim 79, the access point including an interval timer initiated after each transmission of a synchronizing message and such that the transmission of a new synchronizing message is initiated after expiry of the interval timer.*

*86. The wireless data communication system of claim 79, the access point including a transceiver and a wireless transceiver, the transceiver adapted for connecting the access point to a backbone LAN and the wireless transceiver adapted for connecting the access point to a wireless LAN.*

*87. The wireless data communication system of claim 79, each mobile station including a doze timer with a doze interval selected such that each mobile station is in the awake state prior to the next synchronizing message.*

*88. The wireless data communication system of claim 79, wherein each mobile station cannot receive or transmit messages in the doze state.*

*89. The wireless data communication system of claim 79, wherein power consumption in the doze state is up to 90% less than in the awake state.*

*90. A method of operating a mobile wireless station, comprising the steps of:*

*receiving synchronizing messages broadcast from an access point, the synchronizing messages including message indicator portions indicating that additional messages await transmission to the mobile wireless station;*

*determining whether the mobile wireless station is to receive a data message by receiving and processing traffic indicator information from the access point;*

*operating in an awake state of relatively high power consumption during the receiving step and the determining step;*

*changing the operating state to a doze state of relatively low power consumption after the receiving step and the determining step are performed if the mobile wireless station is not to receive a data message; and*

*maintaining the operating state of both transmitter and receiver functions of the mobile wireless station in the awake state for at least a time period beginning immediately after completion of the operating step so that one or more data messages are able to be transmitted to the mobile wireless station if the mobile wireless station is to receive a data message, wherein the mobile wireless station receives one or more data messages from the access point and returns to the doze state when the mobile wireless station determines that no additional data messages await.*

*91. A method of operating a mobile wireless station, comprising the steps of:*

*receiving periodically transmitted synchronizing messages from an access point,*

*operating in an awake state of relatively high power consumption during the receiving step;*

*identifying whether the mobile wireless station is to receive data messages;*

*changing the operating state of the mobile wireless station to doze stage of relatively low power consumption after the receiving step and identifying steps are performed if the mobile wireless station is not to receive a data message; and*

*maintaining both transmitter and receiver functions of the mobile wireless station in the awake state for at least a time period beginning immediately after completion of the operating step so that one or more data messages are able to be transmitted to the mobile wireless station if the mobile wireless station is to receive a data message, wherein the mobile wireless station receives one or more data messages via the access point and returns to the doze state when the mobile wireless station determines that no additional data messages await.*

*92. The method of claim 91, wherein the identifying step utilizes destination identifying information to identify whether the mobile wireless station is to receive data messages from the access point.*

*93. The method of claim 92, wherein the destination identifying information is contained in the periodically transmitted synchronizing message.*

*94. The method of claim 91, wherein the returning step utilizes a message indicator portion to determine that no additional messages await transmission to the mobile wireless station.*

*95. The method of claim 94, wherein the message indicator portion is contained in the periodically transmitted synchronizing message.*

*96. The method of claim 95, wherein the message indicator portion is a count portion identifying the number of messages the mobile wireless station is to receive.*

*97. A mobile wireless station, comprising:*

*a station transceiver adapted to receive and transmit messages; and*

*a switching device, adapted to control the power received by the station transceiver so that the mobile wireless station is controlled to be in an awake state of relatively high power consumption to receive synchronizing messages and traffic indicator information from an access point, wherein the synchronizing messages further include message indicator portions indicating that additional data messages await transmission to the mobile wireless station;*

*and following receipt of the synchronizing messages and the traffic indicator information, if the mobile wireless station has no data messages destined therefore, the switching device changes to a doze state of relatively low power consumption, and if the mobile wireless station has data messages destined therefore, the switching device maintains both transmitter and receiver functions of the mobile wireless station in the awake state for a time period beginning immediately after receiving the synchronizing messages and the traffic indicator information; and*

*wherein the switching device is controllable to return the mobile wireless station to the doze state when the mobile wireless station determines that no additional data messages await.*

*98. The mobile wireless station of claim 97, the mobile wireless station including a doze timer having a doze interval selected such that the mobile wireless station is in the awake state prior to the next periodically transmitted synchronizing message.*

*99. The mobile wireless station of claim 97, wherein the mobile wireless station cannot receive or transmit messages in the doze state.*

*100. The mobile wireless station of claim 97, wherein power consumption in the doze state is up to 90% less than in the awake state.*

*101. A mobile wireless station, comprising:*

*a station transceiver that receives and transmits messages; and*

*a switching device that can switch the mobile wireless station between an awake state of relatively high power consumption so that the station transceiver is capable of receiving messages, and a doze state of relatively low power consumption,*

*wherein the switching device causes the mobile wireless station to be in an awake state to receive periodically transmitted synchronizing messages, and*

*wherein the switching device causes the mobile wireless station to be in the doze state following receipt of the synchronizing messages if no data messages are to be transmitted by an access point to the mobile wireless station, the switching device causes both transmitter and receiver functions of the mobile wireless station to remain in the awake state if data messages are to be transmitted by the access point to the mobile wireless station, and the switching device causes the mobile wireless station to return to the doze state when the mobile wireless station determines that no additional data messages await.*

*102. The mobile wireless station of claim 101, wherein the switching device utilizes destination identifying information to determine whether the mobile wireless station is to receive data messages from the access point.*

*103. The mobile wireless station of claim 102, wherein the destination identifying information is contained in the periodically transmitted synchronizing message.*

*104. The mobile wireless station of claim 101, wherein the switching device utilizes a message indicator portion to determine that no additional messages await transmission to the mobile wireless station.*

*105. The mobile wireless station of claim 104, wherein the message indicator portion is contained in the periodically transmitted synchronizing message.*

*106. The mobile wireless station of claim 105, wherein the message indicator portion is a count portion identifying the number of messages the mobile wireless station is to receive.*

*107. The mobile wireless station of claim 101, the mobile wireless station including a doze timer having a doze interval selected such that the mobile wireless station is in the awake state prior to the next periodically transmitted synchronizing message.*

*108. The mobile wireless station of claim 101, wherein the mobile wireless station cannot receive or transmit messages in the doze state.*

*109. The mobile wireless station of claim 101, wherein power consumption in the doze state is up to 90% less than in the awake state.*

*110. A mobile wireless station, comprising:*

*a station transceiver that receives and transmits messages; and*

*switching device that can switch the mobile wireless station between an awake state of relatively high power consumption so that the station transceiver is capable of receiving messages, and a doze state of relatively low power consumption,*

*wherein the switching device causes the mobile wireless station to be in an awake state to receive periodically transmitted synchronizing messages, and*

*wherein the switching device causes the mobile wireless station to be in the doze state following receipt of the synchronizing messages if no data messages are to be transmitted by an access point to the mobile wireless station, the switching device causes both transmitter and receiver functions of the mobile wireless station to remain in the awake state if data messages are to be transmitted by the access point to the mobile wireless station, and the switching device causes the mobile wireless station to return to the doze state when the mobile wireless station determines that no additional data messages await.*

*111. The mobile wireless station of claim 110, wherein the switching device utilizes destination identifying information to determine whether the mobile wireless station is to receive data messages from the access point.*

*112. The mobile wireless station of claim 111, wherein the destination identifying information is contained in the periodically transmitted synchronizing message.*

*113. The mobile wireless station of claim 110, wherein the switching device utilizes a message indicator portion to determine that no additional messages await transmission to the mobile wireless station.*

*114. The mobile wireless station of claim 113, wherein the message indicator portion is contained in the periodically transmitted synchronizing message.*

*115. The mobile wireless station of claim 114, wherein the message indicator portion is a count portion identifying the number of messages the mobile wireless station is to receive.*

*116. The mobile wireless station of claim 110, the mobile wireless station including a doze timer having a doze interval selected such that the mobile wireless station is in the awake state prior to the next periodically transmitted synchronizing message.*

*117. The mobile wireless station of claim 110, wherein the mobile wireless station cannot receive or transmit messages in the doze state.*

*118. The mobile wireless station of claim 110, wherein power consumption in the doze state is up to 90% less than in the awake state.*

*119. The wireless data communication system of claim 22, wherein the access point is adapted to communicate with a backbone LAN.*

*120. The method of claim 31, wherein the access point is communicating with a backbone LAN.*

*121. The mobile wireless station of claim 34, wherein the access point is adapted to communicate with a backbone LAN.*

*122. The mobile wireless station of claim 40, wherein the access point is adapted to communicate with a backbone LAN.*

*123. The wireless data communication system of claim 47, wherein the access point is adapted to communicate with a backbone LAN.*

*124. The method of claim 53, wherein the access point is communicating with a backbone LAN.*

*125. The mobile wireless station of claim 54, wherein the access point is adapted to communicate with a backbone LAN.*

*126. The mobile wireless station of claim 60, wherein the access point is adapted to communicate with a backbone LAN.*

*127. The method of claim 67, wherein the access point is communicating with a backbone LAN.*

*128. The wireless data communication system of claim 73, wherein the access point is adapted to communicate with a backbone LAN.*

*129. The wireless data communication system of claim 79, wherein the access point is adapted to communicate with a backbone LAN.*

*130. The method of claim 90, wherein the access point is communicating with a backbone LAN.*

*131. The method of claim 91, wherein the access point is communicating with a backbone LAN.*

*132. The mobile wireless station of claim 97, wherein the access point is adapted to communicate with a backbone LAN.*

*133. The method of claim 18, wherein both transmitter and receiver functions of each identified non-selected station are maintained in the awake state for at least the time period beginning immediately after the completion of the operating step.*

*134. The method of claim 133, wherein the transmitter and receiver functions are implemented by a transceiver that is fully powered during the awake state.*

*135. The wireless data communication system of claim 22, wherein both transmitter and receiver functions of each non-selected station having one or more data messages destined therefor are maintained in the awake state for the time period beginning immediately after receiving each synchronizing message and the associated traffic indicator information.*

*136. The wireless data communication system of claim 135, wherein the transmitter and receiver functions are implemented by a transceiver that is fully powered during the awake state.*

*137. The method of claim 31, wherein the transmitter and receiver functions are implemented by a transceiver that is fully powered during the awake state.*

*138. The mobile wireless station of claim 34, wherein the transmitter and receiver functions are implemented by a transceiver that is fully powered during the awake state.*

*139. The mobile wireless station of claim 40, wherein the transmitter and receiver functions are implemented by a transceiver that is fully powered during the awake state.*

*140. The method of claim 46, wherein both transmitter and receiver functions of each identified non-selected station are maintained in the awake state for at least the time period beginning immediately after the completion of the operating step.*

*141. The method of claim 140, wherein the transmitter and receiver functions are implemented by a transceiver that is fully powered during the awake state.*

*142. The wireless data communication system of claim 47, wherein both transmitter and receiver functions of each non-selected station having one or more data messages destined therefor are maintained in the awake state for the time period beginning immediately after receiving each synchronizing message and the associated traffic indicator information.*

*143. The wireless data communication system of claim 142, wherein the transmitter and receiver functions are implemented by a transceiver that is fully powered during the awake state.*

*144. The method of claim 53, wherein the transmitter and receiver functions are implemented by a transceiver that is fully powered during the awake state.*

*145. The mobile wireless station of claim 54, wherein the transmitter and receiver functions are implemented by a transceiver that is fully powered during the awake state.*

*146. The mobile wireless station of claim 60, wherein the transmitter and receiver functions are implemented by a transceiver that is fully powered during the awake state.*

*147. The method of claim 66, wherein both transmitter and receiver functions of each identified non-selected station are maintained in the awake state for at least the time period beginning immediately after the completion of the operating step.*

*148. The method of claim 147, wherein the transmitter and receiver functions are implemented by a transceiver that is fully powered during the awake state.*

*149. The method of claim 67, wherein the transmitter and receiver functions are implemented by a transceiver that is fully powered during the awake state.*

*150. The wireless data communications system of claim 73, wherein both transmitter and receiver functions of each non-selected station having one or more data messages destined therefor are maintained in the awake state for the time period beginning immediately after receiving each synchronizing message and the associated traffic indicator information.*

*151. The wireless data communication system of claim 150, wherein the transmitter and receiver functions are implemented by a transceiver that is fully powered during the awake state.*

*152. The wireless data communication system of claim 79, wherein the transmitter and receiver functions are implemented by a transceiver that is fully powered during the awake state.*

*153. The method of claim 90, wherein the transmitter and receiver functions are implemented by a transceiver that is fully powered during the awake state.*

*154. The method of claim 91, wherein the transmitter and receiver functions are implemented by a transceiver that is fully powered during the awake state.*

*155. The mobile wireless station of claim 97, wherein the transmitter and receiver functions are implemented by a transceiver that is fully powered during the awake state.*

*156. The mobile wireless station of claim 101, wherein the transmitter and receiver functions are implemented by a transceiver that is fully powered during the awake state.*

*157. The mobile wireless station of claim 110, wherein the transmitter and receiver functions are implemented by a transceiver that is fully powered during the awake state.*

*158. The method of claim 18, wherein the time period extends at least until the identified non-selected station receives a data message from the selected station.*

*159. The method of claim 158, wherein the time period extends at least until the identified non-selected station receives the next synchronizing message from the selected station.*

*160. The wireless data communication system of claim 22, wherein the time period extends at least until the non-selected station receives a data message from the selected station.*

*161. The wireless data communication system of claim 160, wherein the time period extends at least until the non-selected station receives the next synchronizing message from the selected station.*

*162. The method of claim 31, wherein the time period extends at least until the mobile wireless station receives a data message from the access point.*

*163. The mobile wireless station of claim 34, wherein the time period extends at least until the mobile wireless station receives a data message from the access point.*

*164. The mobile wireless station of claim 163, wherein the time period extends at least until the mobile wireless station receives the next synchronizing message from the access point.*

*165. The mobile wireless station of claim 40, wherein the time period extends at least until the mobile wireless station receives a data message from the access point.*

*166. The mobile wireless station of claim 165, wherein the time period extends at least until the mobile wireless station receives the next synchronizing message from the access point.*

*167. The method of claim 46, wherein the time period extends at least until the identified non-selected station receives a data message from the selected station.*

*168. The method of claim 167, wherein the time period extends at least until the identified non-selected station receives the next synchronizing message from the selected station.*

*169. The wireless data communication system of claim 47, wherein the time period extends at least until the non-selected station receives a data message from the selected station.*

*170. The wireless data communication system of claim 169, wherein the time period extends at least until the non-selected station receives the next synchronizing message from the selected station.*

*171. The method of claim 66, wherein the time period extends at least until the identified non-selected station receives a data message from the selected station.*

*172. The method of claim 67, wherein the time period extends at least until the identified mobile station receives a data message from the access point.*

*173. The wireless data communication system of claim 73, wherein the time period extends at least until the non-selected station receives a data message from the selected station.*

*174. The wireless data communication system of claim 79, wherein the time period extends at least until the identified mobile station receives a data message from the access point.*

*175. The method of claim 90, wherein the time period extends at least until the mobile wireless station receives a data message from the access point.*

*176. The method of claim 91, wherein the time period extends at least until the mobile wireless station receives a data message from the access point.*

*177. The mobile wireless station of claim 97, wherein the time period extends at least until the mobile wireless station receives a data message from the access point.*

*178. The mobile wireless station of claim 101, wherein the time period extends at least until the mobile wireless station receives a data message from the access point.*

*179. The mobile wireless station of claim 110, wherein the time period extends at least until the mobile wireless station receives a data message from the access point.*

* * * * *

UNITED STATES PATENT AND TRADEMARK OFFICE

CERTIFICATE OF CORRECTION

PATENT NO. : RE 40,032 E
APPLICATION NO. : 10/368018
DATED : January 22, 2008
INVENTOR(S) : Hendrik van Bokhorst et al.

It is certified that error appears in the above-identified patent and that said Letters Patent is hereby corrected as shown below:

In column 18, line 45, replace "*receive*" with --receiver--.
In column 23, line 66, replace "*stage*" with --state--.

Signed and Sealed this

Seventeenth Day of June, 2008

JON W. DUDAS
*Director of the United States Patent and Trademark Office*